(12) United States Patent
Teller et al.

(10) Patent No.: US 10,112,751 B2
(45) Date of Patent: Oct. 30, 2018

(54) LIP PRODUCT CONTAINERS, AND METHODS FOR MANUFACTURING THE SAME

(71) Applicant: EOS PRODUCTS, LLC, New York, NY (US)

(72) Inventors: Jonathan Teller, New York, NY (US); Sanjiv Mehra, New York, NY (US); Peter Waxman, New York, NY (US); Joseph Speter, New York, NY (US); Sherry Jhawar, New York, NY (US); Hamish Campbell, New York, NY (US)

(73) Assignee: EOS PRODUCTS, LLC, New York, NY (US)

( * ) Notice: Subject to any disclaimer, the term of this patent is extended or adjusted under 35 U.S.C. 154(b) by 0 days.

(21) Appl. No.: 15/232,450

(22) Filed: Aug. 9, 2016

(65) Prior Publication Data
US 2018/0044077 A1 Feb. 15, 2018

(51) Int. Cl.
| | |
|---|---|
| *A45D 40/00* | (2006.01) |
| *B65D 51/24* | (2006.01) |
| *B65D 43/02* | (2006.01) |
| *B29C 45/16* | (2006.01) |
| *B29K 101/12* | (2006.01) |
| *B29L 31/00* | (2006.01) |

(52) U.S. Cl.
CPC ....... *B65D 51/245* (2013.01); *A45D 40/0068* (2013.01); *B29C 45/16* (2013.01); *B65D 43/0225* (2013.01); *A45D 2040/0012* (2013.01); *A45D 2200/052* (2013.01); *A45D 2200/053* (2013.01); *B29K 2101/12* (2013.01); *B29L 2031/718* (2013.01)

(58) Field of Classification Search
CPC ...... B65D 51/00; B65D 51/24; B65D 51/245; B65D 51/248; B65D 43/00; B65D 43/02; B65D 43/0202; B65D 43/0225; A45D 40/00; A45D 40/0068; A45D 2040/0006; A45D 2040/0025
USPC .............................................. 206/385, 459.1
See application file for complete search history.

(56) References Cited

U.S. PATENT DOCUMENTS

| | | | |
|---|---|---|---|
| 4,069,935 A | * | 1/1978 | Hampel ............... B65D 50/041 215/203 |
| 4,164,301 A | | 8/1979 | Thayer |

(Continued)

OTHER PUBLICATIONS

U.S. Appl. No. 29/573,688, filed Aug. 2016, Teller et al.

(Continued)

*Primary Examiner* — Steven A. Reynolds
*Assistant Examiner* — Javier A Pagan
(74) *Attorney, Agent, or Firm* — Martin & Ferraro, LLP

(57) ABSTRACT

A lip balm receptacle, comprising: a curved, multi-layered upper portion, formed by a single two-step overmolding injection process. The curved, multi-layered upper portion comprising: i) an interior layer having an outer surface that identifies the lip balm flavor contained in the lip balm receptacle; and ii) an exterior layer. The exterior layer may have a) an outer surface with a different texture, material, or visual appearance than the outer surface of the interior layer; and b) a durable cutout design that comprises at least one aperture through said exterior layer exposing the outer surface of the interior layer.

15 Claims, 17 Drawing Sheets

(56) References Cited

U.S. PATENT DOCUMENTS

| | | |
|---|---|---|
| 4,261,468 A | 4/1981 | Krebs |
| D276,705 S | 12/1984 | Oliveri |
| D291,991 S | 9/1987 | Lee |
| 5,025,817 A | 6/1991 | Wen |
| 5,150,808 A * | 9/1992 | Hamilton ............ B60K 15/0406 220/255 |
| 6,059,133 A * | 5/2000 | Lai ....................... B65D 51/245 116/309 |
| D484,585 S | 12/2003 | Upson |
| D509,890 S | 9/2005 | Stavale |
| D510,991 S | 10/2005 | Harbutt |
| D522,642 S | 6/2006 | Matsuda |
| D536,081 S | 1/2007 | Steinel |
| D543,244 S | 5/2007 | Tsuruha |
| D552,473 S | 10/2007 | Simkin |
| D582,291 S | 12/2008 | de Baschmakoff |
| D585,129 S | 1/2009 | Huang |
| 7,503,331 B2 | 3/2009 | Eng et al. |
| D608,826 S | 1/2010 | Laguatan et al. |
| D611,587 S | 3/2010 | Dineen |
| 7,699,062 B2 | 4/2010 | Sasaki |
| D617,439 S | 6/2010 | Valentino |
| D631,204 S | 1/2011 | Dubitsky et al. |
| D644,939 S | 9/2011 | Teller |
| 8,444,337 B2 * | 5/2013 | Teller .................... A45D 40/00 206/385 |
| 8,888,391 B2 | 11/2014 | Teller et al. |
| D740,493 S | 10/2015 | David |
| D787,338 S | 5/2017 | Dorsinville |
| D789,241 S | 6/2017 | Cao |
| 2006/0201838 A1 | 9/2006 | Sasaki |
| 2006/0254945 A1 | 11/2006 | Green et al. |
| 2008/0110854 A1 | 5/2008 | Kelly |

OTHER PUBLICATIONS

U.S. Appl. No. 29/573,703, filed Aug. 2016, Teller et al.
U.S. Appl. No. 29/573,704, filed Aug. 2016, Teller et al.
U.S. Appl. No. 29/573,710, filed Aug. 2016, Teller et al.
U.S. Appl. No. 29/573,712, filed Aug. 2016, Teller et al.
U.S. Appl. No. 29/573,717, filed Aug. 2016, Teller et al.
U.S. Appl. No. 29/575,719, filed Aug. 2016, Teller et al.
U.S. Appl. No. 29/573,721, filed Aug. 2016, Teller et al.
U.S. Appl. No. 29/573,723, filed Aug. 2016, Teller, et al.
U.S. Appl. No. 29/573,726, filed Aug. 2016, Teller et al.
U.S. Appl. No. 29/593,433, filed Feb. 2017, Teller et al.
U.S. Appl. No. 29/593,445, filed Feb. 2017, Teller et al.
U.S. Appl. No. 29/593,450, filed Feb. 2017, Teller et al.
U.S. Appl. No. 29/593,453, filed Feb. 2017, Teller et al.
U.S. Appl. No. 29/593,454, filed Feb. 2017, Teller et al.
U.S. Appl. No. 29/593,456, filed Feb. 2017, Teller et al.

* cited by examiner

LIP PRODUCT CONTAINERS, AND METHODS FOR MANUFACTURING THE SAME

Applicant's U.S. Pat. Nos. 8,444,337 and 8,888,391 are hereby incorporated by reference in their entirety.

FIELD OF THE DISCLOSURE

This disclosure is related to lip product containers, for example lip balm receptacles, comprising a multi-layer container enclosing a lip care material (e.g., a lip balm, lip gloss, etc.) and to methods of manufacturing the same. The personal care product and/or lip product container may comprise a durable element visible on the outside surface of the container.

BACKGROUND

Containers used to store and dispense solid or semi-solid cosmetic materials, such as lip balms or lip-glosses, employ different shapes and designs. Many such containers may have one or more decorative elements, such as logos, symbols, or other designs, that are often applied to the exterior surface of the container. The use of such decorative elements includes attracting the attention of customers, identifying the source and/or trade name of the product, displaying a desired message and/or visual indicia, creating a desired visual effect to the customer, or combinations thereof. For example, some containers have decorative elements applied to the exterior surface of the receptacle, some include printing or coloration placed on the exterior of the receptacle, and still others include decorative elements formed by providing raised or embossed portions directly on the exterior surface of the receptacle. However, such decorative elements can be uncomfortably irritating to a customer and/or can become easily worn or damaged during normal distribution and/or use of the container.

Some types of decorative elements add significantly to the manufacturing steps, costs and manufacturing complexities.

Accordingly, there is a need for personal care products and/or lip product containers comprising a container for enclosing a lip care product and having a durable element visible on the outside surface of the container and/or a simple, low cost, and/or high speed method for manufacturing the same in suitably large quantities.

SUMMARY

Exemplary embodiments may provide for a method of forming a personal care product, comprising: A) forming a multi-layered container having an upper part and a lower part that connect to form an enclosure, whereby the upper part is formed by (i) injection molding of a first plastic into a die defining a curved first layer of the upper part; and (ii) within a short period of time while the first layer is still at an elevated temperature with respect to typical room temperature (for example, while the first plastic is still soft, i.e., above its glass transition temperature), for example less than 15 seconds or less than 10 seconds or less than 8 seconds or less than 5 seconds or less than 3 seconds, of forming the first layer, forming a second layer by injecting a second plastic onto at least one curved surface of the first layer, and, optionally B) forming a lower part by injection molding; wherein the multi-layered upper part comprises a durable cutout design comprising at least one aperture through said second layer that exposes an outer surface of the interior layer.

Exemplary embodiments may provide for the exterior layer (or second layer) being formed within 15, 10, 8, 5, 3, 2, or 1 seconds of forming the interior layer (or first layer).

Exemplary embodiments may provide for a method of forming a lip care product, for example a lip balm product, said method comprising: A) forming a multi-layered container having an upper part and a lower part that connect to form an enclosure, whereby the upper part is formed by (i) injection molding of a tough, smooth-finished plastic into a die defining a continuously curved interior layer of the upper part to form a smooth finished interior layer having an outer surface of a pre-determined visual appearance; and (ii) within a period of time before the interior layer cools to room temperature and/or cures, overmolding an exterior layer onto the outer surface of the interior layer by injecting a less tough plastic forming an outer surface on the exterior layer that is less smooth (grippier) than the interior layer's outer surface, and optionally B) forming a lower part by injection molding; wherein the multi-layered upper part comprises a durable cutout design comprising a plurality of apertures through said exterior layer that expose the outer surface of the interior layer.

Exemplary embodiments may provide a single two-step overmolding injection method for forming a lip balm receptacle having a curved, multi-layered upper portion, said method comprising: i) injecting a first plastic into a first die to form an interior layer; and ii) within 5 seconds of forming the interior layer, forming an exterior layer having a durable cutout design, by: a) transferring the formed interior layer into a second die; and b) injecting a second plastic into the second die directly on the exterior surface of the formed interior layer to form said exterior layer; wherein the curved, multi-layered upper portion comprises: 1) the interior layer having an outer surface that identifies the lip balm color or lip balm flavor contained in the lip balm receptacle; and 2) the exterior layer having: A) an outer surface with a different texture, material, and/or visual appearance than the outer surface of the interior layer; (and optionally B) the durable cutout design positioned about a debossed logo), said durable cutout design comprising at least one aperture through said exterior layer exposing the outer surface of the interior layer.

In exemplary embodiments, at least one aperture peripheral wall defined by said at least one aperture may be substantially parallel to the direction of movement of the second die.

In exemplary embodiments, the at least one aperture peripheral wall defined by said at least one aperture may be parallel to the direction of movement of the second die.

In exemplary embodiments, the at least one aperture peripheral wall defined by said at least one aperture may be formed by a single direction of movement of the second die.

In exemplary embodiments, said durable cutout design may comprise at least two apertures through said exterior layer exposing the outer surface of the interior layer.

In exemplary embodiments, said durable cutout design may comprise a plurality of apertures through said exterior layer exposing the outer surface of the interior layer.

In exemplary embodiments, the plurality of apertures may comprise at least 2, 3, 4, 5, 6, 7, 8, 9, 10, 11, 12, 13, 14, 15, 16, 17, 18, 19, 20, 21, 22, 23, 24. or 25 apertures.

In exemplary embodiments, each aperture peripheral wall defined by said plurality of apertures may be substantially parallel to the direction of movement of the second die.

In exemplary embodiments, each aperture peripheral wall defined by said plurality of apertures may be parallel to the direction of movement of the second die.

In exemplary embodiments, each aperture peripheral wall defined by said plurality of apertures may be formed by a single direction of movement of the second die.

In exemplary embodiments, the interior layer may be a curved interior layer.

In exemplary embodiments, the exterior layer may be a curved exterior layer.

In exemplary embodiments, the first plastic may be selected from a thermoplastic, polypropylene, polyethylene, polylactide, and polyvinyl chloride. Examples of plastics that may be suitable for the first plastic include food grade packaging plastics, polyethylene terephthalate, high density polyethylene, polyvinyl chloride, low density polyethylene, polypropylene, polystyrene, polycarbonate, polytetrafluoroethylene and/or mixtures and copolymers of the same.

In exemplary embodiments, the second plastic may be selected from a thermoplastic elastomers, styrenic block copolymers, thermoplastic olefins, thermoplastic polyurethanes, thermoplastic copolyester, thermoplastic polyimides, and polymer blend. Examples of plastics that may be suitable for the second plastic include food-grade packaging plastics, polyethylene terephthalate, high density polyethylene, polyvinyl chloride, low density polyethylene, polypropylene, polystyrene, polycarbonate, polytetrafluoroethylene and/or mixtures and copolymers of the same, inclusive of such plastics having an elastomeric additive therein.

Exemplary embodiments described herein may provide for a lip balm receptacle, comprising: a curved, multi-layered upper portion, formed by a single two-step overmolding injection process, comprising: i) an interior layer having an outer surface that identifies the lip balm flavor contained in the lip balm receptacle; and ii) an exterior layer having: a) an outer surface with a different texture, material, and/or visual appearance than the outer surface of the interior layer; and b) a durable cutout design, said durable cutout design comprising at least one aperture through said exterior layer exposing the outer surface of the interior layer.

Exemplary embodiments described herein may provide for the identification of the lip balm flavor being contained in the lip balm receptacle through a correlation of the color or texture of the interior layer (for example the exterior surface of the interior layer or the visible surface of the interior layer) to the lip balm flavor.

Exemplary embodiments described herein may provide for the identification of the lip balm flavor being contained in the lip balm receptacle through a correlation of the shape of the inlay design with the lip balm flavor.

Exemplary embodiments described herein may provide for a lip balm receptacle, comprising: a curved, multi-layered upper portion, formed by a single two-step overmolding injection process, comprising: i) an interior layer having an outer surface that identifies the lip balm flavor contained in the lip balm receptacle; and ii) an exterior layer having: a) an outer surface with a different texture, material, and/or visual appearance than the outer surface of the interior layer; and b) a durable cutout design positioned about a debossed logo, said durable cutout design comprising at least one aperture through said exterior layer exposing the outer surface of the interior layer.

In certain embodiments, one or more aspects may be defined based on the surface area of the outer surface of the exterior layer, the surface area of the outer surface of the interior layer, and/or the exposed surface area of the interior layer. In certain embodiments, the exposed surface area of the interior layer may be defined by the at least one aperture of the outer surface of the interior layer. In certain embodiments, one or more aspects may be defined based on the surface area of the convex hull of the exterior layer (hereinafter, the "convex exterior area"), or a section thereof. In certain embodiments, one or more aspects may be defined based on the surface area of the convex hull of the interior layer (hereinafter, the "convex interior area"), or a section thereof. In certain embodiments, one or more aspects may be defined based on the surface area of a section of the convex hull of the interior layer, wherein said section is defined by the at least one aperture (hereinafter, the "convex exposed interior area"), or a section thereof. In certain embodiments, one or more aspects may be defined based on the ratio of (a) the surface area of the outer surface of the exterior layer to (b) the exposed surface area of the outer surface of the interior layer defined by the at least one aperture (hereinafter, the "coverage ratio"). In certain embodiments, one or more aspects may be defined based on the ratio of (a) the convex exterior area to (b) convex exposed interior area (hereinafter, the "convex coverage ratio").

In certain embodiments, one or more aspects may be defined based on the surface area of the outer surface of the exterior layer of the curved, multi-layer upper portion, the surface area of the outer surface of the interior layer of the curved, multi-layer upper portion, and/or the exposed surface area defined by the at least one aperture of the outer surface of the interior layer of the curved, multi-layer upper portion, or a surface area of a section of any of the foregoing surfaces. In certain embodiments, one or more aspects may be defined based on the surface area of the convex hull of the exterior layer of the curved, multi-layer upper portion (hereinafter, the "upper convex exterior area"), or a section thereof. In certain embodiments, one or more aspects may be defined based on the surface area of the convex hull of the interior layer of the curved, multi-layer upper portion (hereinafter, the "upper convex interior area"), or a section thereof. In certain embodiments, one or more aspects may be defined based on the surface area of a section of the convex hull of the interior layer of the curved, multi-layer upper portion, wherein said section is defined by the at least one aperture (hereinafter, the "upper convex exposed interior area"), or a sub-section thereof. In certain embodiments, one or more aspects may be defined based on the ratio of (a) the surface area of the outer surface of the exterior layer of the curved, multi-layer upper portion to (b) the exposed surface area of the outer surface of the interior layer of the curved, multi-layer upper portion defined by the at least one aperture (hereinafter, the "upper coverage ratio"). In certain embodiments, one or more aspects may be defined based on the ratio of (a) one-half of the upper convex exterior area to (b) upper convex exposed interior area (hereinafter, the "upper convex coverage ratio").

Exemplary embodiments described herein may provide for a lip care product receptacle, for example a lip balm receptacle, said lip care product receptacle comprising: a curved, multi-layered upper portion, formed by a single two-step overmolding injection process, comprising: i) an interior layer having an outer surface that identifies the lip care product flavor contained in the lip care product receptacle; and ii) an exterior layer having: a) an outer surface with a different texture, material, and/or visual appearance than the outer surface of the interior layer; b) a constant or variable thickness in the range of between 0.25 mm and 4 mm; and c) a durable cutout design positioned about a debossed logo, said durable cutout design comprising at least one aperture through said exterior layer exposing the outer surface of the interior layer; wherein: 1) the coverage ratio and/or the convex coverage ratio is at least 1:1 to no more than 98:2, for example 97:3, 95:5, 90:10, or 85:15; 2) the distance between any at least one aperture and any second at least one aperture is equivalent to or greater than its thickness; and 3) the at least one aperture is located at a polar angle θ (theta) of between 5-60 degrees.

Exemplary embodiments described herein may provide for an exterior layer having a thickness of 0.25 mm, 0.30 mm, 0.35, 0.40 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1 mm, 1.05 mm, 1.10 mm, 1.15 mm, 1.20 mm, 1.25 mm, 1.30 mm, 1.35, 1.40 mm, 1.45 mm, 1.5 mm, 1.55 mm, 1.6 mm, 1.65 mm, 1.7 mm, 1.75 mm, 1.8 mm, 1.85 mm, 1.9 mm, 1.95 mm, 2 mm, 2.05 mm, 2.10 mm, 2.15 mm, 2.20 mm, 2.25 mm, 2.30 mm, 2.35 mm, 2.40 mm, 2.45 mm, or 2.50 mm. Exemplary embodiments described herein may provide for an exterior layer having a variable thickness, for example in the range of between 0.25 mm and 4 mm, for example in the range of between 0.5 mm and 3.5 mm, 0.75 mm and 3.0 mm, 1.0 mm and 2.75 mm, 1.0 mm and 2.5 mm, 1.0 mm and 2.25 mm, or in the range of between 1.25 and 2.0 mm.

Exemplary embodiments described herein may provide for a lip balm receptacle, comprising: a curved, multi-layered upper portion, formed by a single two-step overmolding injection process, comprising: i) an interior layer having an outer surface that identifies the lip balm flavor contained in the lip balm receptacle; and ii) an exterior layer having: a) an outer surface with a different texture, material, and/or visual appearance than the surface of the interior layer; b) a thickness of at least 0.25 mm and no more than 4 mm; and c) a durable cutout design positioned about a debossed logo, said durable cutout design comprising at least one aperture through said exterior layer exposing the outer surface of the interior layer; wherein: 1) the upper coverage ratio and/or the upper convex coverage ratio is at least 1:1 to no more than 98:2, for example 97:3, 95:5, 90:10, or 85:15; 2) the distance between any at least one aperture and any second at least one aperture is equivalent to or greater than its thickness; and 3) said durable cutout design is located at: A) a polar angle θ (theta) of between 0-60 degrees, for example in the range of between 5-60 degrees; and B) an azimuthal angle φ (phi) of between 0-360 degrees.

Exemplary embodiments described herein may provide for a lip balm receptacle, comprising: a curved, multi-layered upper portion, formed by a single two-step overmolding injection process, comprising: i) an interior layer having an outer surface that identifies the lip balm flavor contained in the lip balm receptacle; and ii) an exterior layer having: a) an outer surface with a different texture, material, and/or visual appearance than the outer surface of the interior layer; b) a thickness of at least 0.25 mm and no more than 4 mm; and c) a durable cutout design positioned about a debossed logo, said durable cutout design comprising at least one aperture through said exterior layer exposing the outer surface of the interior layer; wherein: 1) the upper coverage ratio and/or the upper convex coverage ratio is at least 1:1 to no more than 98:2, for example 97:3, 95:5, 90:10, or 85:15; 2) the distance between any at least one aperture and any second at least one aperture is equivalent to or greater than its thickness; and 3) said durable cutout design is located at: A) a polar angle θ (theta) of between 0-60 degrees, for example in the range of between 5-60 degrees; and B) an azimuthal angle φ (phi) of between 0-360 degrees.

Exemplary embodiments described herein may provide for a lip balm receptacle, comprising: a curved, multi-layered upper portion, formed by a single two-step overmolding injection process using a cam-less inlay design mold, comprising: i) an interior layer having an outer surface that identifies the lip balm flavor contained in the lip balm receptacle; and ii) an exterior layer having: a) an outer surface with a different texture, material, and/or visual appearance than the outer surface of the interior layer; b) a thickness of at least 0.25 mm and no more than 4 mm; and c) a durable cutout design positioned about a debossed logo, said durable cutout design comprising at least one aperture through said exterior layer exposing the outer surface of the interior layer; wherein: 1) the at least one aperture is located at a polar angle θ (theta) of between 0-60 degrees, for example in the range of between 5-60 degrees; 2) the upper coverage ratio and/or the upper convex coverage ratio is at least 1:1 to no more than 98:2, for example 97:3, 95:5, 90:10, or 85:15; 3) the ratio of A) the surface area of the section of the upper convex exterior area between the polar angle θ (theta) of 5-60 degrees, and B) the surface area of the section of the upper convex exposed interior area between the polar angle θ (theta) of 5-60 degrees is at least 90:10 to no more than 10:90; and 4) the distance between any at least one aperture and any second at least one aperture is equivalent to or greater than its thickness.

Exemplary embodiments described herein may provide for a lip care product receptacle, for example a lip balm receptacle, said lip care product receptacle comprising: a curved, multi-layered upper portion, formed by a single two-step overmolding injection process using a cam-less inlay design mold, comprising: i) an interior layer having an outer surface that identifies the lip care product flavor contained in the lip care product receptacle; and ii) an exterior layer having: a) an outer surface with a different texture, material, and/or visual appearance than the outer surface of the interior layer; b) a thickness of at least 0.25 mm and no more than 4 mm; and c) a durable cutout design positioned about a debossed logo, said durable cutout design comprising at least one of aperture through said exterior layer exposing the outer surface of the interior layer; wherein: 1) the at least one aperture is located at a polar angle θ (theta) of between 0-60 degrees, for example in the range of between 5-60 degrees; 2) the upper coverage ratio and/or the upper convex coverage ratio is at least 1:1 to no more than 98:2, for example 97:3, 95:5, 90:10, or 85:15; 3) the ratio of A) the surface area of the section of the upper convex exterior area between the polar angle θ (theta) of 5-60 degrees, and B) the surface area of the section of the upper convex exposed interior area between the polar angle θ (theta) of 5-60 degrees is at least 90:10 to no more than 10:90; 4) the distance between any at least one aperture and any second at least one aperture is equivalent to or greater than its thickness; and 5) the at least one aperture peripheral wall defined by said at least one aperture is substantially parallel to the longitudinal axis of said curved, multi-layered upper portion.

Exemplary embodiments described herein may provide for a lip balm receptacle, comprising: a curved, multi-layered upper portion, formed by a single two-step overmolding injection process using a cam-less inlay design mold, comprising: i) an interior layer having an outer surface that identifies the lip balm flavor contained in the lip balm receptacle; and ii) an exterior layer in direct contact with the interior layer such that the inner surface of the exterior layer is in direct contact with the outer surface of said interior layer, said exterior layer having: a) an outer surface with a different texture, material, and/or visual appearance than the outer surface of the interior layer; b) a thickness of at least 0.25 mm and no more than 4 mm; and c) a durable cutout design positioned about a debossed logo, said durable cutout design comprising at least one aperture through said exterior layer exposing the outer surface of the interior layer; wherein: 1) the at least one aperture is located at a polar angle θ (theta) of between 0-60 degrees, for example in the range of between 5-60 degrees; 2) the upper coverage ratio and/or the upper convex coverage ratio is at least 1:1 to no more than 98:2, for example 97:3, 95:5, 90:10, or 85:15; 3) the ratio of A) the surface area of the section of the upper convex exterior area between the polar angle θ (theta) of 5-60 degrees, and B) the surface area of the section of the upper convex exposed interior area between the polar angle θ (theta) of 5-60 degrees is at least 90:10 to no more than 10:90, for example 80:20, 75:25, 60:40, 50:50, 40:60, 30:70, or 20:80; 4) the distance between any at least one aperture and any second at least one aperture is equivalent to or greater than its thickness; 5) the at least one aperture forms a basin in the exterior layer, such that the outer surface of the interior layer is the floor of the basin, and said basin comprises a wall extending upward from the basin floor and terminating at an outer surface of the exterior layer; and 6) said basin wall of the at least one aperture is substantially parallel to the longitudinal axis of said curved, multi-layered upper portion.

In exemplary embodiments, the at least one aperture may be located at a polar angle θ (theta) in the range of between 0 degrees and 60 degrees, for example in the range of 5 degrees and 60 degrees, 5 degrees and 55 degrees, 5 degrees and 50 degrees, 5 degrees and 45 degrees, 5 degrees and 40 degrees, or in the range of between 5 degrees and 35 degrees.

In exemplary embodiments, the at least one aperture may have a width of at least 0.5 mm, 0.75 mm, 1 mm, 1.25 mm, or 1.5 mm.

In exemplary embodiments, the at least one aperture may have a maximum width of at least 0.5 mm, 0.75 mm, 1 mm, 1.25 mm, or 1.5 mm.

In exemplary embodiments, the at least one aperture may be circular in shape. In exemplary embodiments, the at least one aperture may be elliptical in shape.

In exemplary embodiments, the at least one aperture may be in a tear-drop shape. In exemplary embodiments, the at least one aperture may be in an elongated tear-drop shape. In exemplary embodiments, the at least one aperture may be symmetrical in shape. In exemplary embodiments, the at least one aperture may be asymmetrical in shape. In exemplary embodiments, the at least one aperture may have C2, C3, C4, C5, or C6 symmetry.

In exemplary embodiments, the durable cutout design may have a symmetrical pattern. In exemplary embodiments, the durable cutout design may have an asymmetrical pattern. In exemplary embodiments, the durable cutout design may have a pattern with C2, C3, C4, C5, or C6 symmetry.

In exemplary embodiments, the exterior layer of the durable cutout design may last the lifetime of the lip balm receptacle.

In exemplary embodiments, the exterior layer of the durable cutout design may outlast the usable lifetime of the lip balm receptacle.

In exemplary embodiments, the exterior layer of the durable cutout design is resistant from being torn from the interior layer and remains durable for the lifetime of the lip balm receptacle.

In exemplary embodiments, the exterior layer of the durable cutout design resist being torn from the interior layer and remains durable for the usable lifetime of the lip balm receptacle.

In exemplary embodiments, the exterior layer of the durable cutout design resists being readily torn from the interior layer and remains durable for the usable lifetime of the lip balm receptacle.

In exemplary embodiments, the exterior layer of the durable cutout design resists being readily removed from the interior layer without damaging the lip balm receptacle.

In exemplary embodiments, the exterior layer of the durable cutout design is resistant to being readily removed (for example, easily removed like scratching paint or a decal from the surface).

In exemplary embodiments, the durable cutout design (for example, the totality of the cutouts) exposes at least 5% and no more than 60%, 55%, 50%, 45%, 40%, 35%, 30%, 25%, 20%, 15% or 10% of the surface area of the outer surface of the interior layer.

In exemplary embodiments, the outer surface of the exterior layer of the lip balm receptacle coincides with at least 60%, 65%, 70%, 75%, 80%, 85%, 87%, 90%, 91%, 92%, 93%, 94%, 95%, 96%, 97%, 98%, or 99% of the convex hull of the lip balm receptacle.

In exemplary embodiments, the outer surface of the exterior layer present on said curved, multi-layered upper portion of the lip balm receptacle coincides with at least 30%, 35%, 40%, 45%, 50%, 55%, or at least 60% of the convex hull of the curved, multi-layered upper portion of the lip balm receptacle.

In exemplary embodiments, the durable cutout design may be visible (for example, through the translucent inner layer) when viewed from the interior side of the curved, multi-layered upper portion.

In exemplary embodiments, the curved, multi-layered upper portion may be a continuously curved, multi-layered upper portion.

In exemplary embodiments, all exterior surfaces of the curved, multi-layered upper portion may be exclusive of a flat or planar surface.

In exemplary embodiments, the curved, multi-layered upper portion may be rounded or mounded.

In exemplary embodiments, the curved, multi-layered upper portion may, for example, be conical or egg-shaped or spherical or frustoconical or bullet-shaped or rounded or mounded or dome-shaped or ellipsoid-shaped or torus-shaped or barrel-shaped or cylinder-shaped.

In exemplary embodiments, the curved, multi-layered upper portion may be hemispherical or substantially hemispherical.

In exemplary embodiments, the curvature of the interior layer may be exclusive of a flat or planar surface.

In exemplary embodiments, the curvature of the interior layer may, for example, be conical or egg-shaped or spherical or frustoconical or bullet-shaped or rounded or mounded or dome-shaped or ellipsoid-shaped or torus-shaped or barrel-shaped or cylinder-shaped.

In exemplary embodiments, the curvature of the interior layer may be hemispherical or substantially hemispherical.

In exemplary embodiments the curvature of the interior layer may be substantially the same as the curvature of the said exterior layer.

In exemplary embodiments, the curvature of the interior layer may be substantially parallel, extends parallel, or may be parallel to the curvature of the exterior layer.

In exemplary embodiments, the curvature of the interior layer may be substantially parallel, extends parallel, or is parallel to the curvature of the exterior layer such that no portion of said curved interior layer mechanically interlocks within an aperture extending through said exterior layer.

In exemplary embodiments, the curvature of the exterior layer may be exclusive of a flat or planar surface.

In exemplary embodiments, the curvature of the exterior layer may be rounded or mounded.

In exemplary embodiments, the curvature of the exterior layer may be hemispherical or substantially hemispherical.

In exemplary embodiments, the curvature of the exterior layer may be substantially parallel, extends parallel, or may be parallel to the curvature of the interior layer.

In exemplary embodiments, the curvature of the exterior layer may be substantially parallel, extends parallel, or may be parallel to the curvature of the interior layer such that no portion of said curved interior layer mechanically interlocks within an aperture extending through said exterior layer.

In exemplary embodiments, the lip balm receptacle may be or may be substantially egg-shaped, oval, elliptical, spherical, oblong, ovoid, or pear-shaped or dome-shaped or ellipsoid-shaped or torus-shaped or barrel-shaped or cylinder-shaped.

In exemplary embodiments, the at least one aperture peripheral wall defined by said at least one aperture may be parallel to the longitudinal axis of said curved, multi-layered upper portion, plus or minus 1-10 degrees relative to the longitudinal axis.

In exemplary embodiments, the at least one aperture peripheral wall defined by said at least one aperture may be parallel to the longitudinal axis of said curved, multi-layered upper portion.

In exemplary embodiments, the at least one aperture peripheral wall defined by said at least one aperture may be beveled.

In exemplary embodiments, the at least one aperture peripheral wall defined by said at least one aperture may be stepped.

In exemplary embodiments, the at least one aperture peripheral wall defined by said at least one aperture may be substantially perpendicular to the exterior surface of the interior layer.

In exemplary embodiments, the at least one aperture peripheral wall defined by said at least one aperture may be perpendicular to the exterior surface of the interior layer.

In exemplary embodiments, the at least one aperture peripheral wall defined by said at least one aperture may be less than perpendicular to the exterior surface of the interior layer.

In exemplary embodiments, the at least one aperture peripheral wall defined by said at least one aperture may be substantially parallel to the direction of the pour point of the mold.

In exemplary embodiments, the at least one aperture peripheral wall defined by said at least one aperture may be parallel to the direction of the pour point of the mold.

In exemplary embodiments, all (or substantially all) aperture peripheral walls may be parallel to the direction of the pour point of the mold.

In exemplary embodiments, the basin wall defined by said at least one aperture may be parallel to the longitudinal axis of said curved, multi-layered upper portion, plus or minus 1-10 degrees relative to the longitudinal axis.

In exemplary embodiments, all (or substantially all) basin walls may be parallel to the longitudinal axis of said curved, multi-layered upper portion, plus or minus 1-10 degrees relative to the longitudinal axis.

In exemplary embodiments, the basin wall defined by said at least one aperture may be parallel to the longitudinal axis of said curved, multi-layered upper portion.

In exemplary embodiments, the interior layer may be a decorative interior layer.

In exemplary embodiments, the exterior layer may be in direct contact with the exterior surface of the interior layer and exclusive of an adhesive layer between said exterior layer and said interior layer.

In exemplary embodiments, the exterior layer may not be torn from the interior layer for the lifetime of the lip balm receptacle. In exemplary embodiments, the exterior layer may not be torn from the interior layer for the usable lifetime of the lip balm receptacle. In exemplary embodiments, the exterior layer and the interior layer may be coupled together via a bond formed during the single two-step overmolding injection process.

In exemplary embodiments, the exterior layer may be in direct contact with the interior layer such that the bottom surface of the exterior layer is in direct contact with the outer surface of said interior layer.

In exemplary embodiments, the exterior layer may be in direct contact with the decorative interior layer such that the bottom surface of the exterior layer may be in direct contact with the outer surface of said decorative interior layer.

In exemplary embodiments, a portion of the at least one aperture may be defined by: i) a first portion of the exterior layer having a length of at least 5 mm, for example between 5 mm and 10 mm, 8 mm, or 6 mm and a width greater than the exterior layer thickness (for example the exterior layer thickness may be 4 mm or less, for example 3 mm, 2.5 mm, 2 mm, 1.5 mm, or 1.0 mm; and ii) a second portion of the exterior layer, opposing said first portion of said exterior layer, having a length of at least 5 mm, for example between 5 mm and 10 mm, 8 mm, or 6 mm.

In exemplary embodiments, a portion of the at least one aperture may be defined by: i) a first portion of the exterior layer having a length of at least 5 mm, for example between 5 mm and 10 mm, 8 mm, or 6 mm, and a width ranging between 1-3 mm; and ii) a second portion of the exterior layer, opposing said first portion of said exterior layer, having a length of at least 5 mm and a width ranging between 1-3 mm.

In exemplary embodiments, a portion of the at least one aperture may be defined by: i) a first portion of the exterior layer having a length of at least 5 mm, for example between 5 mm and 10 mm, 8 mm, or 6 mm, a narrowest width of between 1-1.5 mm, and a widest width of between 1.6-3 mm; and ii) a second portion of the exterior layer, opposing said first portion of said exterior layer, having a length of at least 5 mm, a narrowest width of between 1-1.5 mm, and a widest width of between 1.6-3 mm.

In exemplary embodiments, a portion of the at least one aperture may be defined by: i) a first portion of the exterior layer having a length of at least 5 mm, for example between 5 mm and 10 mm, 8 mm, or 6 mm, and a uniform width of between 1-2 mm; and ii) a second portion of the exterior layer, opposing said first portion of said exterior layer, having a length of at least 5 mm and a uniform width of between 1-2 mm. In exemplary embodiments, the first portion of the exterior layer may have a varying width ranging between 1 and no more than 3 mm. In exemplary embodiments, the first portion of the exterior layer may have a graduating width ranging from 1 up to 3 mm. In exemplary embodiments, the first portion of the exterior layer may have a width ranging between 1-3 mm, varying no more than 20% over the length of said first portion. In exemplary embodiments, the second portion of the exterior layer may have a varying width ranging between 1 and 3 mm. In exemplary embodiments, the second portion of the exterior layer may have a graduating width ranging between 1-3 mm. In exemplary embodiments, the second portion of the exterior layer may have a width ranging between 1-3 mm, varying no more than 20% over the length of said first portion.

In exemplary embodiments, the surface of the interior layer may be smooth or glossy.

In exemplary embodiments, the surface of the interior layer may be polypropylene.

In exemplary embodiments, the surface of the interior layer may be visibly distinct from, of a different color, or of a same color as the surface of the exterior layer.

In exemplary embodiments, the surface of the exterior layer may be soft touch or matte finish.

In exemplary embodiments, the surface of the exterior layer may be thermoplastic elastomer.

In exemplary embodiments, the surface of the exterior layer may be visibly distinct from, of a different color, or of a same color as the surface of the interior layer.

In exemplary embodiments, the debossed logo may be framed or centrally positioned by the durable cutout design.

In exemplary embodiments, the debossed logo may be recessed by at least 0.25 mm, 0.5 mm, or 0.75 mm, relative to an outer surface of the exterior layer.

In exemplary embodiments, the interior layer may have a uniform thickness. In exemplary embodiments, the interior layer may have a varying thickness.

In exemplary embodiments, the exterior layer may have a uniform thickness. In exemplary embodiments, the exterior layer may have a varying thickness.

In exemplary embodiments, the thickness of the exterior layer may be the narrowest dimension of said exterior layer. In exemplary embodiments, the thickness of the exterior layer may be narrower than the smallest width of the at least one aperture through said exterior layer. In exemplary embodiments, the thickness of the exterior layer may be narrower than the smallest width of any of the plurality of apertures through said exterior layer.

In exemplary embodiments, the thickness of the exterior layer may be in the range of between 0.25 mm and 4 mm, for example in the range of between 0.5 mm and 3.5 mm, 0.75 mm and 3.0 mm, 1.0 mm and 2.75 mm, 1.0 mm and 2.5 mm, 1.0 mm and 2.25 mm, or in the range of between 1.25 and 2.0 mm.

In exemplary embodiments, the exposed interior layer may be the sole identifier or visual indicia of the lip balm flavor when said lip balm receptacle is closed.

In exemplary embodiments, the appearance of the exposed interior layer may be the sole identifier or visual indicia of the lip balm flavor when said lip balm receptacle is closed.

In exemplary embodiments, the color of the exposed interior layer may be the sole identifier or visual indicia of the lip balm flavor when said lip balm receptacle is closed.

In exemplary embodiments, the plurality of apertures may occupy between 5-50%, 10-50%, 20-50%, 30-50%, 15-45%, or 40-50%, of the surface area within a polar angle $\theta$ (theta) in the range of between 0 degrees and 60 degrees, for example in the range of 5 degrees and 60 degrees, 5 degrees and 55 degrees, 5 degrees and 50 degrees, 5 degrees and 45 degrees, 5 degrees and 40 degrees, or in the range of between 5 degrees and 35 degrees of the curved, multi-layered upper portion.

In exemplary embodiments, the upper coverage ratio and/or the upper convex coverage ratio may be in the range of 50:50 to 95:5, for example 60:40, 70:30, 80:20, 90:10.

In exemplary embodiments, the surface of the exposed interior layer may be recessed relative to the outer surface of the exterior layer.

In exemplary embodiments, the exterior layer may protect the outer surface of the exposed interior layer. In exemplary embodiments, the exterior layer may protect the outer surface of the exposed interior layer from degradation. In exemplary embodiments, the exterior layer may protect the outer surface of the exposed interior layer from wear and tear, for example by avoiding exposing the interior layer from contact when the lip balm receptacle is placed on a flat hard surface.

In certain embodiments, at least a portion of the exposed outer surface of the interior layer may be made scratch-resistant or scratch-proof by designing the exterior layer in accordance with the shape and surface area of the at least one aperture. In certain embodiments, said scratch-resistant or scratch-proof exposed outer surface of the interior layer may not intersect the surface of a convex hull of the lip balm receptacle. In certain embodiments, the outer surface of the interior layer is exposed in parts through the apertures in the exterior layer and protected, for example by contact with flat hard surfaces, by the exterior layer as the outer surface of the interior surface does not intersect the surface of a convex hull of the lip balm receptacle.

In exemplary embodiments, the durable cutout design or designs may be located from a point spaced apart from the pour point to enable sufficient flow of the second plastic (or plastic forming the exterior layer), for example, at least a 1 mm diameter, 2 mm diameter or a 3 mm diameter about the at least one pour point and spaced apart from portions of the mold where the surface of the exterior layer approaches 90 degrees, for example greater than 85 degrees, 80 degrees, or 75 degrees with respect to the release movement of the mold.

In exemplary embodiments, the durable cutout design may be located to a polar angle $\theta$ (theta) of between 5-80 degrees, for example 5-70 degrees, 5-60 degrees, 5-50 degrees, 10-70 degrees, 10-60 degrees, 10-50 degrees, 15-70 degrees, 15-60 degrees, 15-50 degrees or 15-45 degrees, and spanning an azimuthal angle $\varphi$ (phi) of between 5-360 degrees, 50-360 degrees, 100-360 degrees, 180-360 degrees, 270-360 degrees, or 90-270 degrees, of the curved, multi-layered upper portion. In exemplary embodiments, at least a portion of the interior layer may be exposed or outwardly visible when the receptacle is closed. In exemplary embodiments, at least 5%, at least 10%, at least 20%, or at least 30%, of the interior layer may be exposed or outwardly visible when the receptacle is closed. In exemplary embodiments, no more than 60%, no more than 50%, or no more than 40%, of the interior layer may be exposed or outwardly visible when the receptacle is closed. In exemplary embodiments, the exterior layer may cover less than the entirety of the interior layer of said curved, multi-layered upper portion when the receptacle is closed.

In exemplary embodiments, the exterior layer may cover no more than 98%, 95%, 90%, 85%, 80%, 75%, 70%, 65%, 60%, 55%, 50%, 45%, 40%, 35%, 30%, 25%, or 20%, of the interior layer of said curved, multi-layered upper portion when the receptacle is closed. In exemplary embodiments, the exposed interior layer may be outwardly visible when the receptacle is closed.

In exemplary embodiments, the upper coverage ratio and/or the upper convex coverage ratio of the curved, multi-layered upper portion may be at least 1:1, at least 60:40, at least 70:30, at least 80:20, at least 90:10, or at least 95:5, when the receptacle is closed.

In exemplary embodiments, the upper coverage ratio and/or the upper convex coverage ratio of the curved, multi-layered upper portion may be no more than 97:3, no more than 95:5, no more than 90:10, no more than 85:15, or no more than 75:25, when the receptacle is closed.

In exemplary embodiments, the ratio of A) the surface area of the section of the upper convex exterior area between the polar angle θ (theta) of 5-60 degrees, and B) the surface area of the section of the upper convex exposed interior area between the polar angle θ (theta) of 5-60 degrees may be at least 90:10, at least 80:20, at least 70:30, at least 60:40, at least 1:1, at least 40:60, at least 30:70, or at least 20:80, when the receptacle is closed.

In exemplary embodiments, the ratio of A) the surface area of the section of the upper convex exterior area between the polar angle θ (theta) of 5-60 degrees, and B) the surface area of the section of the upper convex exposed interior area between the polar angle θ (theta) of 5-60 degrees may be no more than 90:10, no more than 80:20, no more than 70:30, no more than 60:40, or no more than 1:1, when the receptacle is closed.

In exemplary embodiments, the single two-step overmolding injection process for the curved, multi-layered upper portion may take less than 1 min, 55 sec, 50 sec, 45 sec, 40 sec, 35 sec, 30 sec, 25 sec, 20 sec, 15 sec, or 10 sec.

In exemplary embodiments, the curved, multi-layered upper portion comprising the durable cutout design may be formed by a single two-step overmolding injection process repeatedly, at high-speed, efficiently, consistently, or combinations thereof.

In exemplary embodiments, the interior layer may be prepared from a first plastic.

In exemplary embodiments, the exterior layer may be prepared from a second plastic.

In exemplary embodiments, the first plastic may have an appearance different from the second plastic, for example it may contrast in color, texture, reflection, uniformity and/or combination of these.

In exemplary embodiments, the first plastic may have a color different from the second plastic.

In exemplary embodiments, the interior layer may be prepared from a first plastic mixture.

In exemplary embodiments, the exterior layer may be prepared from a second plastic mixture.

In exemplary embodiments, the first plastic may be iridescent. In exemplary embodiments, the first plastic may be transparent, or semi-transparent. In exemplary embodiments, the first plastic may be translucent. In exemplary embodiments, the first plastic may be pearlescent. In exemplary embodiments, the first plastic may be white. In exemplary embodiments, the first plastic may be off-white. In exemplary embodiments, the first plastic may be pink. In exemplary embodiments, the first plastic may have a reflective finish.

In exemplary embodiments, the second plastic may be gold. In exemplary embodiments, the second plastic may be silver. In exemplary embodiments, the second plastic may be white. In exemplary embodiments, the second plastic may be black. In exemplary embodiments, the second plastic may have a flat finish. In exemplary embodiments, the second plastic may have a non-slip surface.

In exemplary embodiments, the lip balm may be white. In exemplary embodiments, the lip balm may be off-white. In exemplary embodiments, the lip balm may be pink. In exemplary embodiments, the lip balm may be iridescent. In exemplary embodiments, the lip balm may be transparent, clear, or semi-transparent. In exemplary embodiments, the lip balm may be pearlescent. In exemplary embodiments, the lip balm may comprise reflective particles.

In exemplary embodiments, the interior layer and the exterior layer may be visibly distinct. In exemplary embodiments, the interior layer and the exterior layer may have different appearances. In exemplary embodiments, the interior layer and the exterior layer may have different colored materials.

In exemplary embodiments, the interior layer may be different in color than the exterior layer, as measured by colorimetry.

In exemplary embodiments, the interior layer may be at least 0.05 to 0.8, for example 0.3-0.6, 0.2-0.4 or 0.1-0.2, units of absorbance different in color than the exterior layer, as measured by colorimetry.

In exemplary embodiments, the outer surface of the interior layer may have a glossy finish and the exterior layer surface may have a flat finish.

In exemplary embodiments, the appearance of the first plastic may be substantially similar to the color of the lip balm.

In exemplary embodiments, the appearance of the first plastic may be similar to the color of the lip balm. In exemplary embodiments, the appearance of the first plastic may be identical to the color of the lip balm. In exemplary embodiments, the color of the first plastic may be substantially similar to the color of the lip balm. In exemplary embodiments, the color of the first plastic may be similar to the color of the lip balm. In exemplary embodiments, the color of the first plastic may be identical to the color of the lip balm. In exemplary embodiments, the first plastic and the lip balm may be iridescent. In exemplary embodiments, the first plastic and the lip balm may be transparent, or at least semi-transparent. In exemplary embodiments, the first plastic and the lip balm may be pearlescent.

In exemplary embodiments, the lip balm receptacle is configured such that the first plastic may be capable of indicating the color of the lip balm within the receptacle. In exemplary embodiments, the lip balm receptacle may be configured such that the first plastic is capable of indicating the flavor of the lip balm within the receptacle.

In exemplary embodiments, the durable cutout design may comprise at least two apertures through said exterior layer exposing the outer surface of the interior layer.

In exemplary embodiments, the durable cutout design may comprise a plurality of apertures through said exterior layer exposing the outer surface of the interior layer.

In exemplary embodiments, the plurality of apertures may comprise at least 3, 4, 5, 6, 7, 8, 9, 10, 11, 12, 13, 14, 15, 16, 17, 18, 19, or 20 apertures.

In exemplary embodiments, each of the plurality of apertures may be located at a polar angle θ (theta) in the range of between 0 degrees and 75 degrees, for example in the range of 5 degrees and 60 degrees, 5 degrees and 55 degrees, 5 degrees and 50 degrees, 5 degrees and 45 degrees, 5 degrees and 40 degrees, or in the range of between 5 degrees and 35 degrees.

In exemplary embodiments, each of the plurality of apertures may have a width of at least 0.5 mm, 0.75 mm, 1 mm, 1.25 mm, or 1.5 mm.

In exemplary embodiments, each of the plurality of apertures may have a maximum width of at least 0.5 mm, 0.75 mm, 1 mm, 1.25 mm, or 1.5 mm.

In exemplary embodiments, a minimum distance between any two apertures of the plurality of apertures may be at least 0.5 mm, 0.75 mm, 1 mm, 1.25 mm, or 1.5 mm, and no more than 2 mm.

In exemplary embodiments, a minimum distance between any two apertures of the plurality of apertures may be at least 0.25 mm and no more than 4 mm, when at least one aperture of the two apertures has a maximum width of at least 0.5 mm.

In exemplary embodiments, a minimum distance between any two apertures of the plurality of apertures may be at least 0.5 mm and no more than 2 mm, when at least one aperture of the two apertures has a maximum width of at least 0.5 mm.

In exemplary embodiments, a maximum distance between two adjacent apertures of the plurality of apertures may be no more than 2 mm.

In exemplary embodiments, each aperture peripheral wall defined by said plurality of apertures may be parallel to the longitudinal axis of said curved, multi-layered upper portion, plus or minus 1-10 degrees relative to the longitudinal axis.

In exemplary embodiments, each aperture peripheral wall defined by said plurality of apertures may be parallel to the longitudinal axis of said curved, multi-layered upper portion.

In exemplary embodiments, each aperture peripheral wall defined by said plurality of apertures may be beveled. In exemplary embodiments, each aperture peripheral wall defined by said plurality of apertures may be stepped. In exemplary embodiments, each aperture peripheral wall defined by said plurality of apertures may be substantially perpendicular to the exterior surface of the interior layer. In exemplary embodiments, each aperture peripheral wall defined by said plurality of apertures may be perpendicular to the exterior surface of the interior layer. In exemplary embodiments, each aperture peripheral wall defined by said plurality of apertures may be less than perpendicular to the exterior surface of the interior layer. In exemplary embodiments, each aperture peripheral wall defined by said plurality of apertures may be substantially parallel to the direction of the pour point of the mold. In exemplary embodiments, each aperture peripheral wall defined by said plurality of apertures may be parallel to the direction of the pour point of the mold.

In exemplary embodiments, a portion of the at least one aperture of the plurality of apertures may be defined by: i) a first portion of the exterior layer having a length of at least 5 mm and a width of greater than the exterior layer thickness and no more than 3 mm; and ii) a second portion of the exterior layer, opposing said first portion of said exterior layer, having a length of at least 5 mm and a width of greater than the exterior layer thickness and no more than 3 mm.

In exemplary embodiments, a portion of the at least one aperture of the plurality of apertures may be defined by: i) a first portion of the exterior layer having a length of at least 5 mm and a width ranging between 1-3 mm; and ii) a second portion of the exterior layer, opposing said first portion of said exterior layer, having a length of at least 5 mm and a width ranging between 1-3 mm.

In exemplary embodiments, the durability of the exterior layer may be achieved in part by controlling the spacing, or width of the exterior layer, between adjacent apertures for example by having a minimum dimension between any of the plurality of apertures being defined by: i) a minimum dimension of exterior layer between two adjacent apertures, wherein the largest of the two adjacent apertures has a length of at least 15 mm, a narrowest width of at least 10 mm, of at least 3 mm, for example at least 4 mm, at least 5 mm and/or: ii) a minimum dimension of exterior layer between two adjacent apertures, wherein the largest of the two adjacent apertures has a no dimension larger than 3 mm, for example 4 mm or 5 mm, of at least 1 mm, for example at least 1.5 mm, or 2 mm. In exemplary embodiments, at least a first aperture and at least a second aperture of the plurality of apertures may be positioned within a polar angle θ (theta) of between 5-60 degrees over an azimuthal angle φ (phi) of between 10-25 degrees.

DESCRIPTION OF THE DRAWINGS

Notwithstanding other forms which may fall within the scope of the disclosure as set forth herein, specific embodiments will now be described by way of example and with reference to the accompanying drawings in which.

DETAILED DESCRIPTION

Exemplary embodiments of the disclosure relate to personal care products and lip product containers comprising a multi-layer container enclosing a lip care material (e.g., a lip balm, lip gloss, etc.) and to methods of manufacturing the same. The personal care product and/or lip product container may comprise a durable element visible on the outside surface of the container.

Figure 5C:
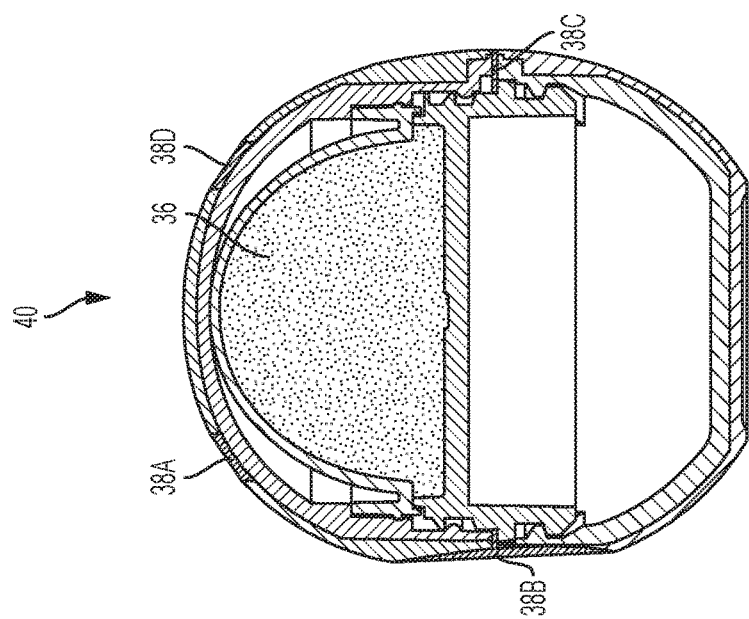
FIGS. 5A-5C are an illustration of the convex hull of the exemplary embodiment depicted in FIG. 1 taken at section 5A-5A.
Figure 5B:
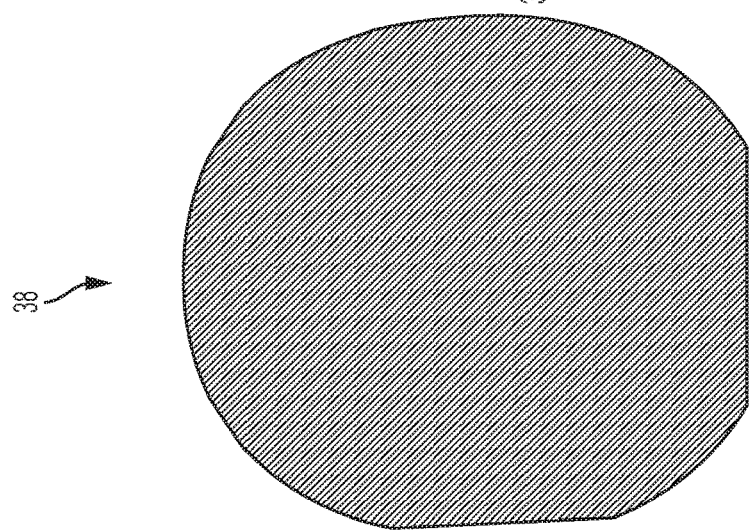
Figure 5A:
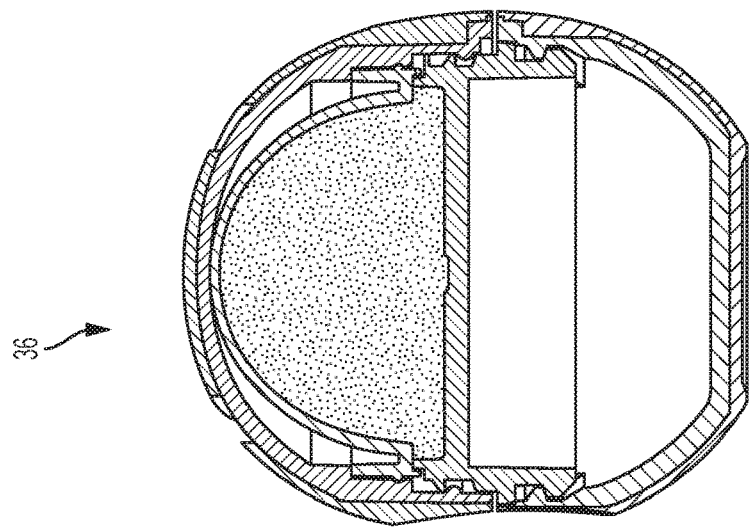

An object is convex if any line connecting two points on the object falls entirely within the object. Every article, whether or not convex, for example a lip balm receptacle or a curved, multi-layered upper portion of a lip balm receptacle, has a convex hull, defined as the smallest convex object which contains said article. Moreover, the convex hull of a two-dimensional cross-section of a three-dimensional article is necessarily contained within the convex hull of the article. For example, FIG. 5 illustration of a cross-section of the convex hull of the exterior layer of a lip balm receptacle. FIG. 5A shows the lip balm receptacle internals 36, inclusive of the exterior layer of the lip balm receptacle, taken at cross-section 5A-5A of FIG. 1. FIG. 5B shows a cross-section of said convex hull 38 corresponding to the same cross-section as presented in FIG. 5A. FIG. 5C shows an overlay 40, consisting of the lip balm receptacle internals 36 on top of the convex hull 38 along said cross-section. Several portions of the convex hull 38A-D are visible from behind the lip balm receptacle internals 36.

Exemplary embodiments described herein may provide for a lip balm receptacle, formed using an injection molding system. The lip balm receptacle may be produced for example by injection molding, including, for example, co-injection molding and overmolding. In co-injection molding systems, different molten materials are injected into a single mold to create a plurality of layers. In overmolding systems each injection operation is performed in a different mold cavity and typically within a time period (for example within 20 seconds, 14 seconds, 10 seconds, 7 seconds, 4 seconds, 2 seconds or less than 1 second, such that the first, or previously-injected, material is still at a temperature above its glass transition temperature when the second (or subsequent) material is introduced. For example, the first injection operation may be performed in a mold cavity to create the first layer of the upper portion of the lip balm receptacle and the mold is adjusted to create a further cavity for a second layer immediately atop the first layer. This may be accomplished by changing the cavity and using the same core that holds the molded article such that the outer surface of the defines a portion of the further cavity. During the second injection, for example, the second plastic contacts the outer surface of the first layer, while the first layer is still at an elevated temperature, for example, still soft or above its glass transition temperature or not fully cured, and bonds to the first layer, exclusive of a adhesive or other material of composition, to form the multi-layer article. This overmolding operation may be repeated such that a multi-layer can include more than two injection of materials and form articles using more than two resins and/or with more than two layers.

In exemplary embodiments a lip balm receptacle or a portion, for example the upper portion or lower portion, may be formed using a high-speed injection molding system. Such high speed overmolding can produce for example, a plurality of parts per mold (inclusive of multiple parts of the mold to form a single part) per minute, for example 20, 5-10, 5-7, 3-5, 3, or 2 or more multi-layered portions of the lip balm receptacle per mold, per minute. In exemplary embodiments, said high speed overmolding may allow for the manufacture of a multiple quantity of parts, for example the multi-layered upper portion, of the receptacle, per mold per minute, for example at least 3-10, 4, 5-7, 6-8 or at least 10 per mold, per minute.

In exemplary embodiments a high-quality, lip balm receptacle or a portion, for example the upper portion, having a dureable multi-layered design may be formed using a high-speed injection molding system and/or process with a multi-step, for example a two-step, overmolding process characterized by a quality metric, such as minimum defect rate. In certain embodiments, the quality metric may be the defect rate of the process. In certain embodiments, the defect rate of the process may be characterized by the percentage of portions, for example the multi-layered upper portion, produced by the process per mold that have an unacceptable defect upon completion of the process, for example when removed from the mold. A defect may include for example if any aperture thereon is at least partially and/or significantly obscured or fouled with a portion of the second layer material. An aperture may be partially obscured if at least 0.5% of said aperture is visibly obscured, for example at least 1%, 2%, 5%, 10%, 15%, or at least 20% of the aperture is visibly obscured. In certain embodiments, a desired defect rate may be achieved with a durable cutout design wherein the apertures have a specified positioning and/or minimum size. In certain embodiments, for example, a desired defect rate of less than 1%, for example less than 0.5%, 0.1%, 0.075%, 0.05%, or less than 0.005%, may be achieved wherein no one aperture of the durable cutout design has a minimum dimension of less than 0.5 mm, for example a minimum dimension of less than 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or less than 3.0 mm. In certain embodiments, a desired defect rate of less than 1%, for example less than 0.5%, 0.1%, 0.075%, 0.05%, or less than 0.005%, may be obtained, wherein each of the apertures of the durable cutout design are located at a polar angle $\theta$ (theta) of less than 70 degrees, for example less than 55 degrees, 50 degrees, 49 degrees, 48 degrees, 47 degrees, 46 degrees, 45 degrees, 44 degrees, 43 degrees, 42 degrees, 41 degrees, or less than 40 degrees. In certain embodiments, a desired defect rate of less than 1%, for example less than 0.5%, 0.1%, 0.075%, 0.05%, or less than 0.005%, may be obtained, wherein the minimum dimension of any aperture and the largest polar angle $\theta$ (theta) is at least 0.5 mm and no more than 60 degrees, for example at least 0.5 mm and no more than 55 degrees, at least 0.5 mm and no more than 45 degrees, at least 0.5 mm and no more than 40 degrees, at least 1.0 mm and no more than 55 degrees, at least 1.0 mm and no more than 45 degrees, at least 1.0 mm and no more than 40 degrees, at least 2.0 mm and no more than 55 degrees, at least 2.0 mm and no more than 45 degrees, or at least 2.0 mm and no more than 40 degrees. In certain embodiments, a desired defect rate of less than 1%, for example less than 0.5%, 0.1%, 0.075%, 0.05%, or less than 0.005%, may be obtained, by designing the mold for the apertures, for example the second mold for the second layer of the multi-layer upper portion, such that the apertures are sufficiently spaced apart such that the second layer material between any two apertures has a minimum width (or distance), for example, at least 1 mm, 2 mm, 3 mm, 4 mm, 5 mm, 8 mm, or 10 mm.

Figure 1:
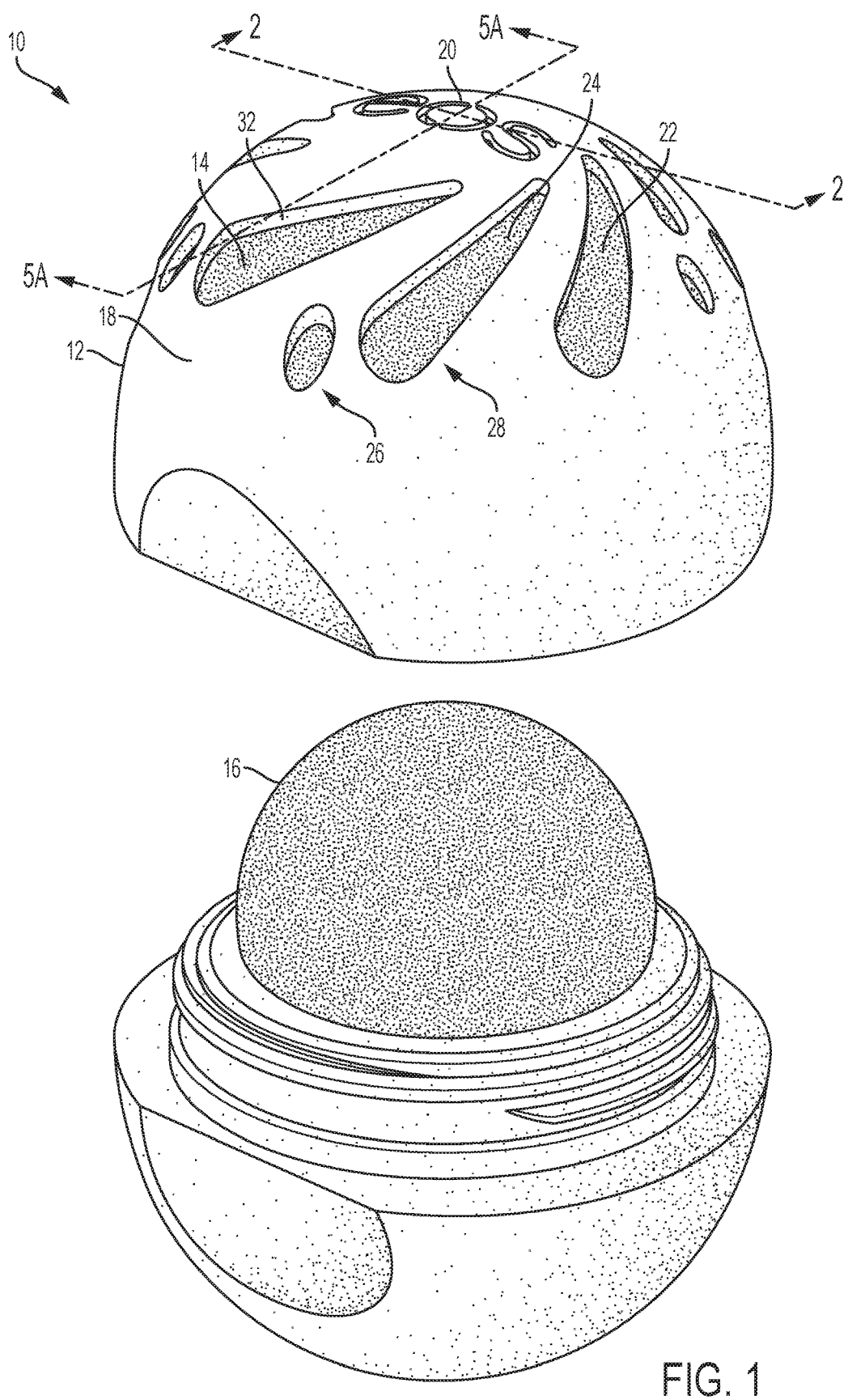
FIG. 1 is a depiction of an exemplary embodiment of a lip product container (for example a lip balm receptacle) comprising a multi layered container.
Figure 2:
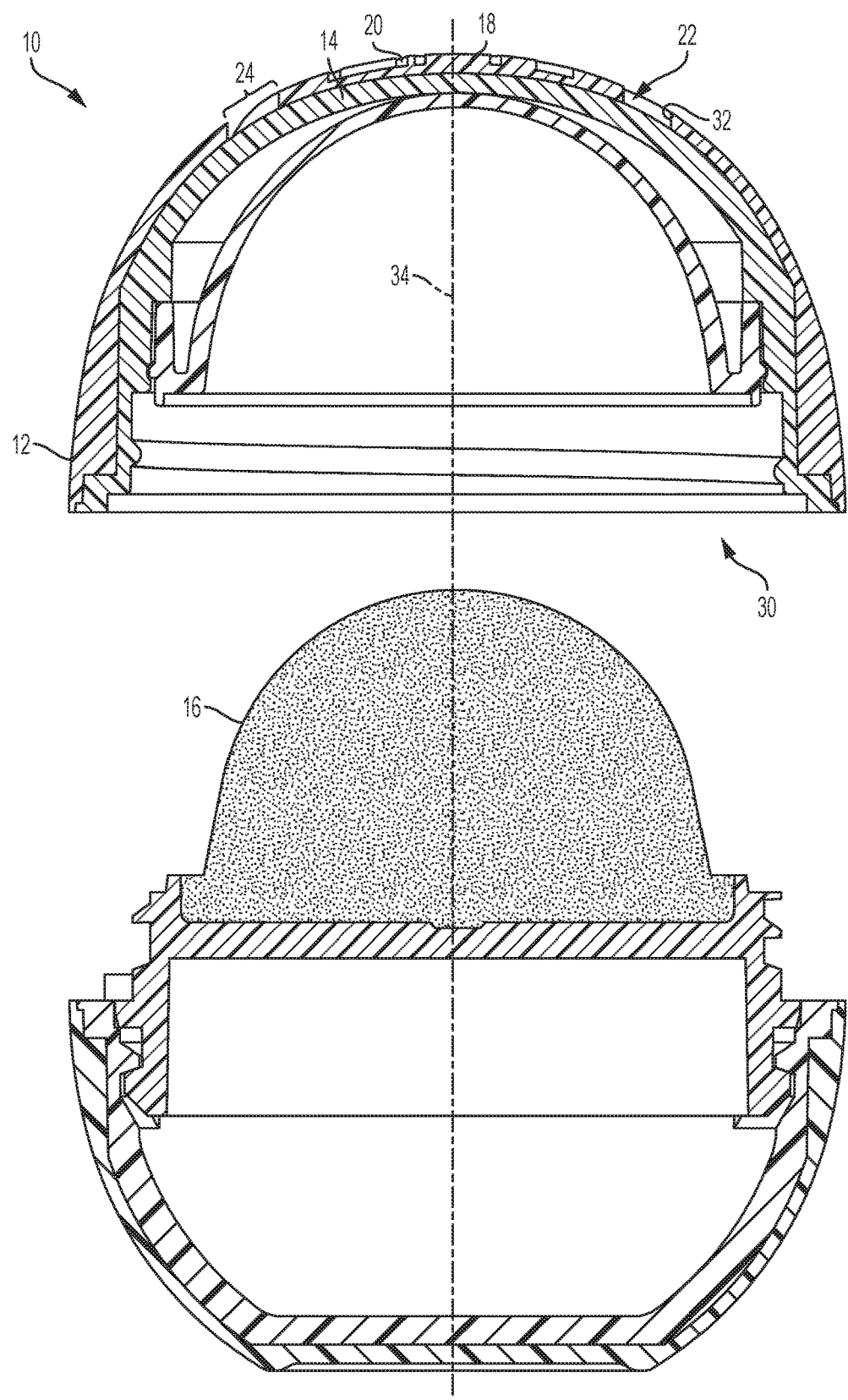
FIG. 2 is cross-sectional view of the exemplary embodiment of FIG. 1, taken at section 2-2.
Figure 3:
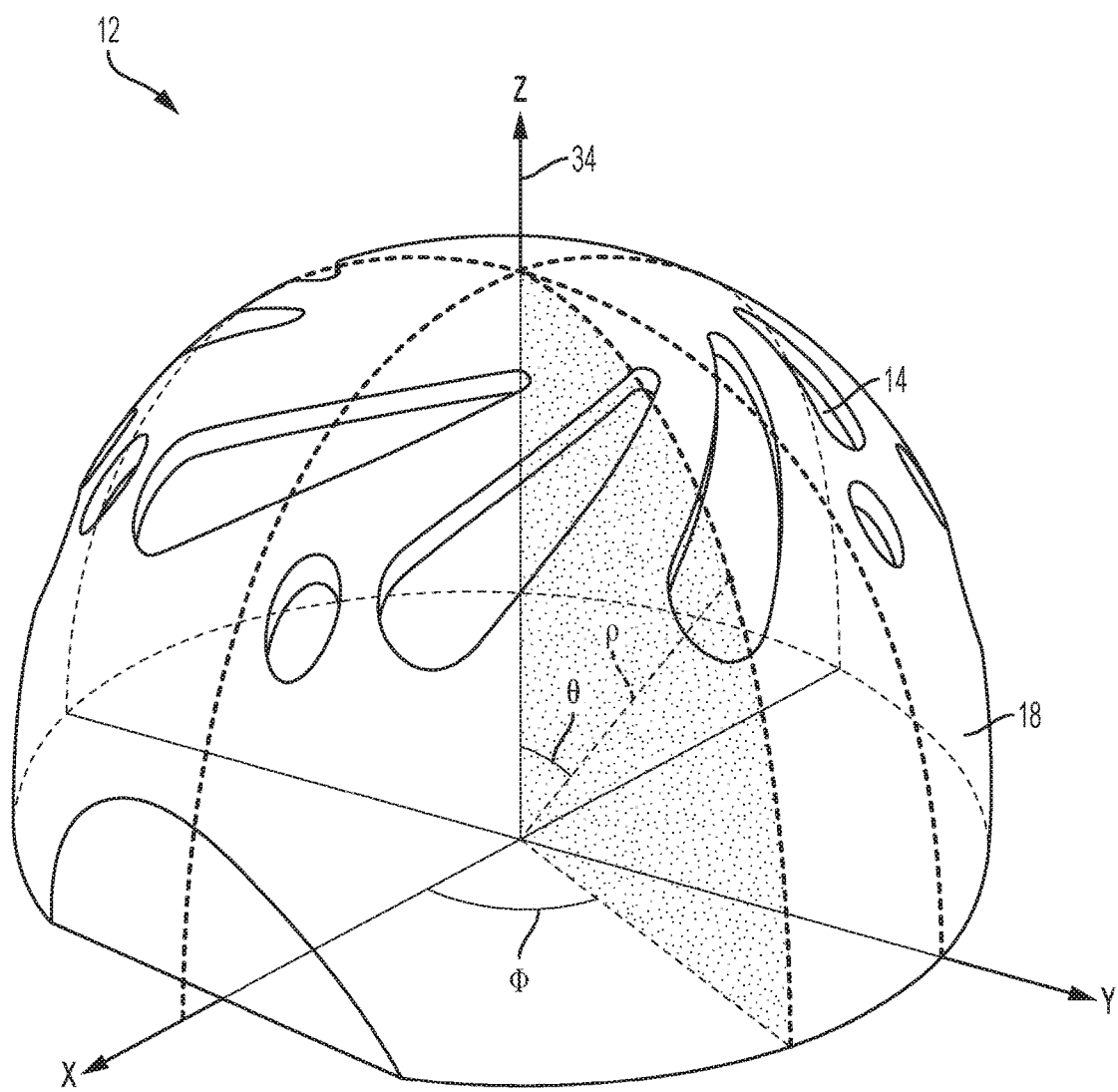
FIG. 3 is an illustration of the geometry of the top portion of the exemplary embodiment of FIG. 1 in Cartesian and Polar coordinates.
Figure 4:
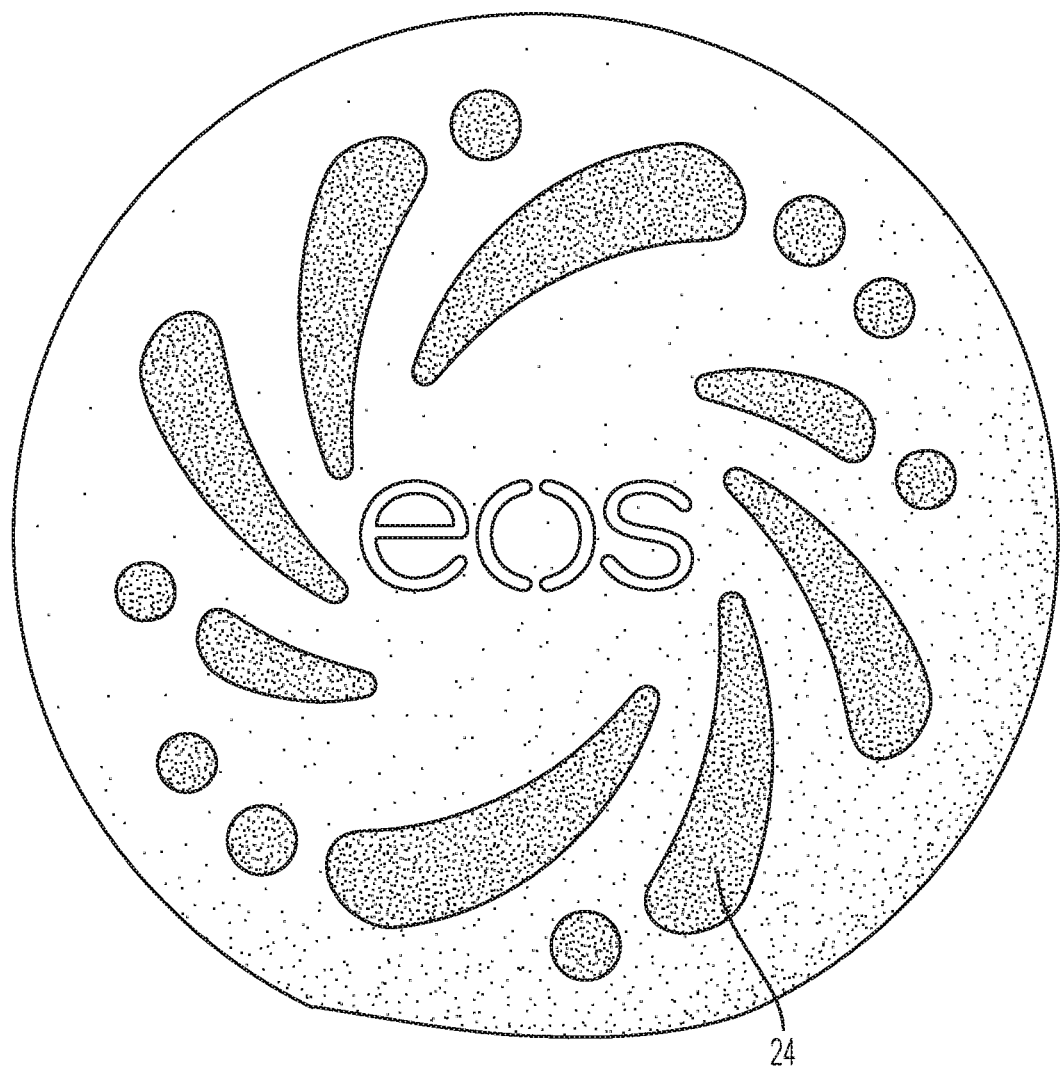
FIG. 4 is a top view of the exemplary embodiment depicted in FIG. 1.

As illustrated in FIGS. 1-3, exemplary embodiments described herein may provide for a lip balm receptacle 10, comprising a curved, multi-layered upper portion 12, formed by a single two-step overmolding injection process. The multi-layered upper portion may comprise i) an interior layer 14 having an outer surface at a radial distance $\rho$ (rho) (see FIG. 3) that identifies the lip balm 16 flavor contained in the lip balm receptacle 10; and ii) an exterior layer 18 having: a) an outer surface with a different texture, material, and/or visual appearance than the outer surface of the interior layer 14; and b) positioned about a debossed logo 20 may be a durable cutout design 22, said durable cutout design 22 comprising at least one aperture 24 through said exterior layer 18 exposing the outer surface of the interior layer 14.

In certain embodiments, the lip balm receptacle 10 may have diameter in the range of 21 mm to 60 mm, for example 30 mm to 50 mm, 38 mm to 46 mm, or in the range of 40 mm to 43 mm. For example, the diameter of the lip balm receptacle may be approximately 40 mm, 41 mm, 42 mm, 43 mm, 44 mm, or approximately 45 mm.

In certain embodiments, the lip balm receptacle may have a longitudinal height in the range of 23 mm to 62 mm, for example 32 mm to 52 mm, 40 mm to 48 mm, or in the range of 42 mm to 45 mm. For example, the longitudinal height of the lip balm receptacle may be approximately 42 mm, 43 mm, 44 mm, 45 mm, 46 mm or approximately 47 mm.

In certain embodiments, the curved, multi-layered upper portion 12 may have a longitudinal height in the range of 12 mm to 30 mm, for example 18 mm to 27 mm, 20 mm to 26 mm, or in the range of 23 mm to 26 mm. For example, the longitudinal height of the curved, multi-layered upper portion 12 may be approximately 21 mm, 22 mm, 23 mm, 24 mm, 25 mm or approximately 26 mm.

Exemplary embodiments, for example as depicted in FIGS. 1-3, may provide for a lip balm receptacle 10, comprising a curved, multi-layered upper portion 12, formed by a single two-step overmolding injection process. The upper portion 12 may comprise i) an interior layer 14 having an outer surface that identifies the lip balm 16 flavor contained in the lip balm receptacle; and ii) an exterior layer 18 having: a) an outer surface with a different texture, material, and/or visual appearance than the outer surface of the interior layer; b) a thickness of at least 0.25 mm and no more than 4 mm; and c) positioned about an optional debossed logo 20 may be a durable cutout design 22, said durable cutout design 22 comprising at least one aperture 24 through said exterior layer 18 exposing the outer surface of the interior layer 14. The surface area ratio of the exterior layer 18 to the exposed interior layer 14 may be at least 1:1 to no more than 98:2, for example 97:3, 95:5, 90:10, or 85:15. Each portion of the exterior layer 18 may have a dimension equivalent to or thicker than its thickness. The at least one aperture may be located at a polar angle θ (theta) of between 5-60 degrees (see FIG. 3).

Exemplary embodiments, for example, may provide for a lip balm receptacle 10, comprising a curved, multi-layered upper portion, formed by a single two-step overmolding injection process. The upper portion 12 may comprise i) an interior layer 14 having an outer surface that identifies the lip balm 16 flavor contained in the lip balm receptacle; and ii) an exterior layer 18 having: a) an outer surface with a different texture, material, and/or visual appearance than the outer surface of the interior layer; b) a thickness of at least 0.25 mm and no more than 4 mm, for example 3 mm, 1-3 mm, 2 mm or 1-4 mm; and c) positioned about an optional debossed logo 20 may be a durable cutout design 22, said durable cutout design 22 comprising at least one aperture through said exterior layer 18 exposing the outer surface of the interior layer 14. The ratio of the surface area of the outer surface of the exterior layer to the surface area of the exposed outer surface of the interior layer may be at least 1:1 to no more than 98:2, for example 97:3, 95:5, 90:10, or 85:15. The portion of the exterior layer may have a dimension equivalent to or thicker than its thickness. The durable cutout design may be located at: A) a polar angle θ (theta) of between 5-60 degrees; and B) an azimuthal angle φ (phi) of between 0-360 degrees (see FIG. 3).

In exemplary embodiments the lip balm receptacle 10 may, for example, have 1) at least one aperture may be located at a polar angle θ (theta) of between 5-60 degrees; 2) a ratio of the surface area of the outer surface of the exterior layer to the surface area of the exposed outer surface of the interior layer may be at least 1:1 to no more than 97:3; 3) a ratio of the surface area of the outer surface of the exterior layer to the surface area of the exposed outer surface of the interior layer between the polar angle θ (theta) of 5-60 degrees may be at least 90:10 to no more than 10:90; 4) a distance between any at least one aperture and any second at least one aperture is equivalent to or greater than its thickness; and/or 5) at least one aperture peripheral wall defined by said at least one aperture may be substantially parallel to the longitudinal axis of said curved, multi-layered upper portion.

In exemplary embodiments the lip balm receptacle 10 may, for example, have 1) at least one aperture may located at a polar angle θ (theta) of between 5-60 degrees; 2) an upper coverage ratio and/or the upper convex coverage ratio may be at least 1:1 to no more than 97:3; 3) a ratio of A) the surface area of the section of the upper convex exterior area between the polar angle θ (theta) of 5-60 degrees, and B) the surface area of the section of the upper convex exposed interior area between the polar angle θ (theta) of 5-60 degrees may be at least 90:10 to no more than 10:90; 4) each portion of the exterior layer may have a dimension equivalent to or thicker than its thickness; 5) at least one aperture may form a basin in the exterior layer, such that the outer surface of the interior layer is the floor of the basin, and said basin comprising a wall extending upward from the basin floor and terminating at an outer surface of the exterior layer; and/or 6) said basin wall of the at least one aperture is substantially parallel to the longitudinal axis of said curved, multi-layered upper portion.

In exemplary embodiments, the at least one aperture 24 may be located at a polar angle θ (theta) in the range of between 0 degrees and 60 degrees, for example in the range of 5 degrees and 60 degrees, 5 degrees and 55 degrees, 5 degrees and 50 degrees, 5 degrees and 45 degrees, 5 degrees and 40 degrees, or in the range of between 5 degrees and 35 degrees.

In exemplary embodiments, the at least one aperture 24 may have a width of at least 0.5 mm, 0.75 mm, 1 mm, 1.25 mm, or 1.5 mm.

In exemplary embodiments, the at least one aperture 24 (see FIG. 1) may have a maximum width of at least 0.5 mm, 0.75 mm, 1 mm, 1.25 mm, or 1.5 mm.

In exemplary embodiments, the at least one aperture 24 (see FIG. 1) may be circular 26 in shape. In exemplary embodiments, the at least one aperture may be elliptical 26 in shape.

In exemplary embodiments, the at least one aperture 24 (see FIG. 1) may be in a tear-drop shape 28. In exemplary embodiments, the at least one aperture 24 may be in an elongated tear-drop shape 28. In exemplary embodiments, the at least one aperture may be symmetrical in shape. In exemplary embodiments, the at least one aperture may be asymmetrical in shape. In exemplary embodiments, the at least one aperture may have C2, C3, C4, C5, or C6 symmetry.

In exemplary embodiments, the durable cutout design may have a symmetrical pattern. In exemplary embodiments, the durable cutout design may have an asymmetrical pattern. In exemplary embodiments, the durable cutout design may have a pattern with C2, C3, C4, C5, or C6 symmetry.

In exemplary embodiments, the exterior layer of the durable cutout design 22 (see FIG. 1) may not be torn from the interior layer 14 for the lifetime of the lip balm receptacle. In certain embodiments, the lifetime of the lip balm receptacle is for example at least 6 months, for example at least 9 months, 12 months, 18 months, 2 years, 3 years, 5 years, or at least 10 years.

In exemplary embodiments, the exterior layer of the durable cutout design 22 (see FIG. 1) may not be torn from the interior layer 14 for the usable lifetime of the lip balm receptacle. In certain embodiments, the usable lifetime of the lip balm receptacle is inclusive of all times after the lip balm receptacle is manufactured until: (a) the lip balm contained therein is spent; or (b) the maximum usable lifetime or (C) at least the shelf-life. In certain other embodiments, the maximum usable lifetime of the lip balm receptacle is for example at least 3 months, for example at least 6 months, 9 months, 1 year, 1-3 years, 2 years, 4 years, or at least 8 years.

In exemplary embodiments, the exterior layer of the durable cutout design 22 (see FIG. 1) may not be torn from the interior layer 14 and remains durable for the lifetime of the lip balm receptacle.

In exemplary embodiments, the exterior layer 18 (see FIG. 1) of the durable cutout design 22 may not be torn from the interior layer 14 and remains durable for the usable lifetime of the lip balm receptacle.

In exemplary embodiments, the durable cutout designs expose, for example, at least 5% and no more than 60%, 55%, 50%, 45%, 40%, 35%, 30%, 25%, 20%, 15% or 10% of the surface area of the outer surface of the interior layer 14.

In exemplary embodiments, the durable cutout design 22 (see FIG. 1) may be visible when viewed from the interior side 30 of the curved, multi-layered upper portion, for example when the interior layer is transparent, semi-transparent, translucent, or semi-translucent.

In exemplary embodiments, the curved, multi-layered upper portion 12 (see FIG. 1) may be a continuously curved, multi-layered upper portion. In exemplary embodiments, the curved, multi-layered upper portion 12 may be exclusive of a flat or planar surface. In exemplary embodiments, the curved, multi-layered upper portion 12 may be rounded or mounded. In exemplary embodiments, the curved, multi-layered upper portion 12 may be hemispherical or substantially hemispherical.

In exemplary embodiments, the curvature of the interior layer 14 (see FIG. 1) may be exclusive of a flat or planar surface. In exemplary embodiments, the curvature of the interior layer 14 may be rounded or mounded. In exemplary embodiments, the curvature of the interior layer 14 may be hemispherical or substantially hemispherical. In exemplary embodiments, the curvature of the interior layer 14 may be substantially parallel, extends parallel, or may be parallel to the curvature of the exterior layer 18. In exemplary embodiments, the curvature of the interior layer 14 may be substantially parallel, extends parallel, or is parallel to the curvature of the exterior layer 18 such that no portion of said curved interior layer mechanically interlocks within an aperture extending through said exterior layer.

In exemplary embodiments, the curvature of the exterior layer 18 (see FIG. 1) may be exclusive of a flat or planar surface. In exemplary embodiments, the curvature of the exterior layer 18 may be rounded or mounded. In exemplary embodiments, the curvature of the exterior layer 18 may be hemispherical or substantially hemispherical. In exemplary embodiments, the curvature of the exterior layer 18 may be substantially parallel, extends parallel, or may be parallel to the curvature of the interior layer. In exemplary embodiments, the curvature of the exterior layer 18 may be substantially parallel, extends parallel, or may be parallel to the curvature of the interior layer 14 such that no portion of said curved interior layer mechanically interlocks within an aperture extending through said exterior layer.

In exemplary embodiments, the lip balm receptacle may be or may be substantially egg-shaped, oval, elliptical, oblong, ovoid, or pear-shaped.

In exemplary embodiments, the aperture 24 (see FIG. 1) peripheral wall 32 defined by said at least one aperture may be parallel to the longitudinal axis 34 of said curved, multi-layered upper portion, plus or minus 1-10 degrees relative to the longitudinal axis. In exemplary embodiments, the aperture 24 peripheral wall 32 defined by said at least one aperture may be parallel to the longitudinal axis 34 of said curved, multi-layered upper portion. In exemplary embodiments, the aperture peripheral wall 32 defined by said at least one aperture 24 may be beveled. In exemplary embodiments, the aperture peripheral wall 32 defined by said at least one aperture 24 may be stepped. In exemplary embodiments, the aperture peripheral wall 32 defined by said at least one aperture 24 may be substantially perpendicular to the exterior surface of the interior layer. In exemplary embodiments, the aperture peripheral wall 32 defined by said at least one aperture 24 may be perpendicular to the exterior surface of the interior layer 14. In exemplary embodiments, the aperture peripheral wall 32 defined by said at least one aperture 24 may be less than perpendicular to the exterior surface of the interior layer 14. In exemplary embodiments, the aperture peripheral wall 32 defined by said at least one aperture 24 may be substantially parallel to the direction of a material injected through the pour point of the mold, wherein said material is used to form the aperture. In exemplary embodiments, the aperture peripheral wall 32 defined by said at least one aperture 24 may be parallel to the direction of the pour point of the mold. In exemplary embodiments, the peripheral wall 32 defined by said at least one aperture 24 may be parallel to the longitudinal axis of said curved, multi-layered upper portion, plus or minus 1-10 degrees relative to the longitudinal axis. In exemplary embodiments, the peripheral 32 wall defined by said at least one aperture 24 may be parallel to the longitudinal axis of said curved, multi-layered upper portion.

In exemplary embodiments, the interior layer may be a decorative interior layer or partially decorative.

In exemplary embodiments, the exterior layer 18 (see FIG. 1) may be in direct contact with the exterior surface of the interior layer 14 and exclusive of an adhesive layer between said exterior layer and said interior layer.

In exemplary embodiments, the durability of a portion of the exterior layer positioned between two apertures may be characterized. In certain embodiments, for example, a portion of the exterior layer may be positioned between a first aperture and a second aperture and have an average thickness $\tau$, wherein each of said apertures may define respective portions of the outer surface of the interior layer that are not in contact with the exterior layer. The first aperture may have an associated surface area $A_1$ defined as the surface area of said exterior layer-free portion defined by the first aperture. The second aperture may have an associated surface area $A_2$ defined as the surface area of said exterior layer-free portion defined by the second aperture. Between the two apertures may be a portion of the outer surface of the interior layer covered by the exterior layer. In certain embodiments, said portion of the outer surface of the interior layer covered by the exterior layer may be the portion of the outer surface of the interior layer bounded by (a) the first aperture, (b) the second aperture, and (c) projection lines of the smallest projection (i.e., the projection having the smallest surface area, $A_M$) of the smaller aperture onto the larger of the two apertures wherein the projection lines are equidistant in relation to one another. In certain embodiments, the portion of the exterior layer between the first aperture and the second aperture may be the portion of the exterior layer $M_{12}$ that is normal to the portion of the outer surface of the interior layer covered by the exterior layer. In certain embodiments, a metric $DM_{12}$ for the durability of $M_{12}$ may be given by the following equation.

$$DM_{12} = \frac{A_M}{(A_M + 2 \times \min(A_1, A_2))} \times \tau^{-1}$$

Figure 6A:
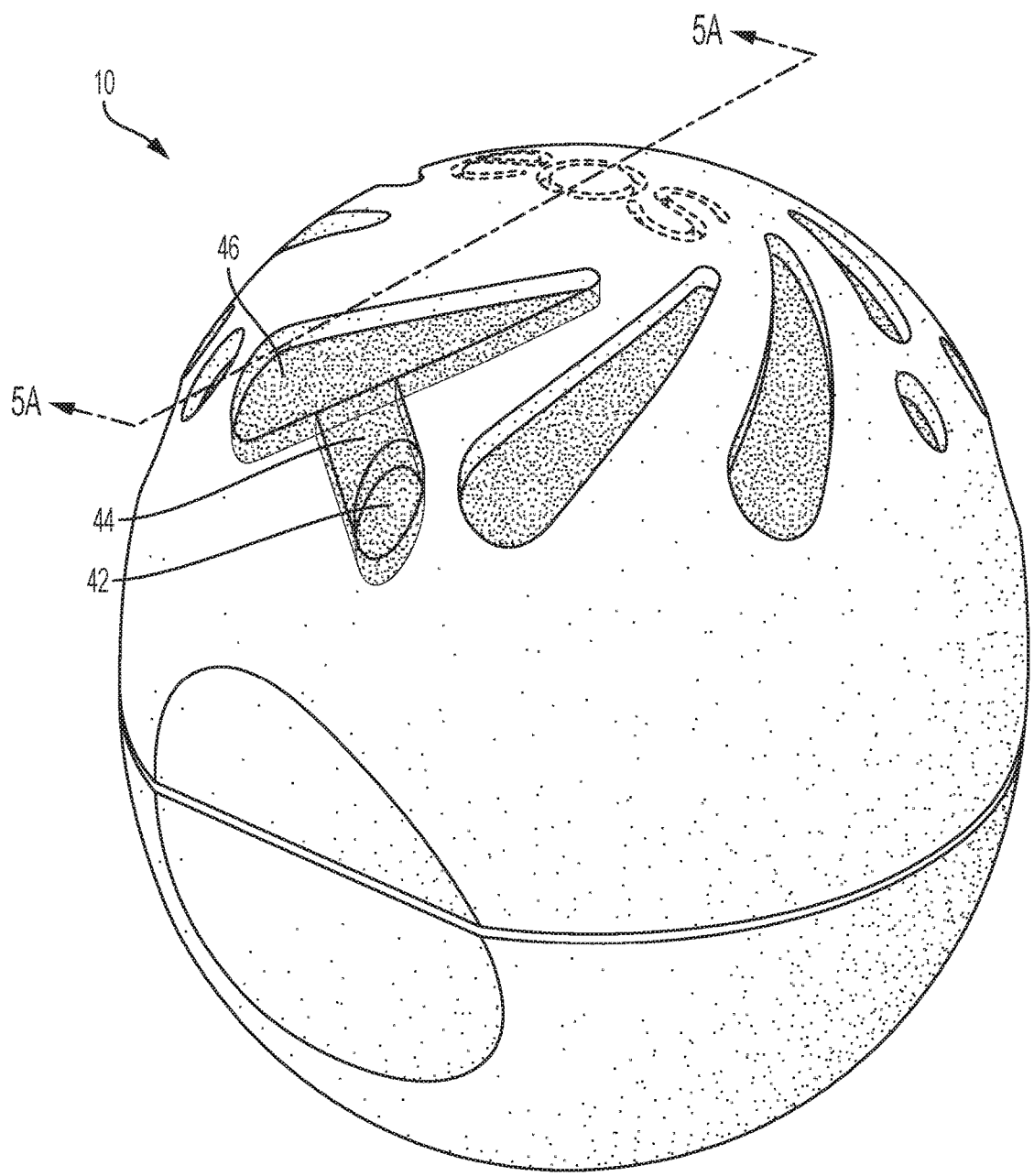
FIGS. 6A-6B are an illustration of a portion of the exterior layer covering a portion of the interior layer between two apertures of the exemplary embodiment depicted in FIG. 1.
Figure 6B:
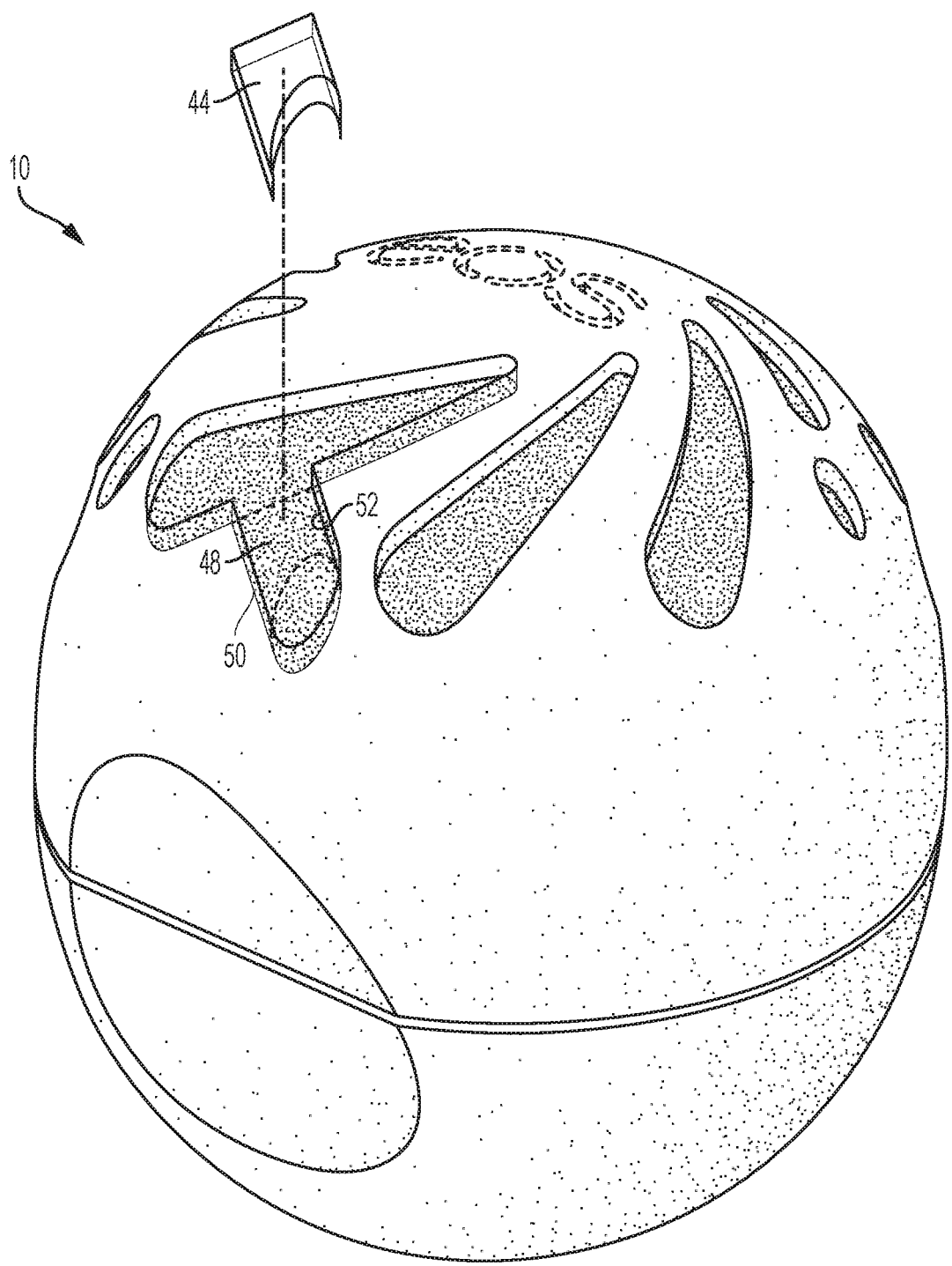
Figure 7A:
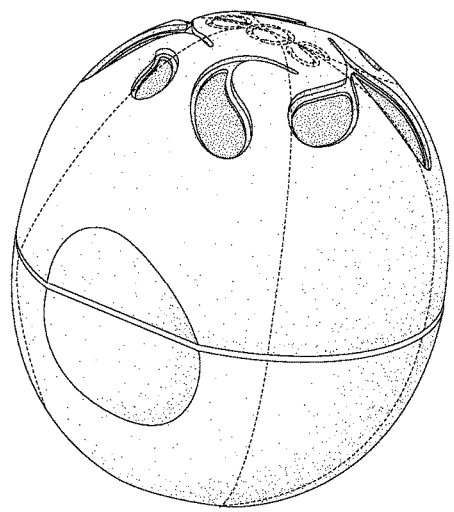
FIGS. 7A-7G, 8A-8G, 9A-9G, 10A-10G, and 11A-11G depict additional embodiments of the lip balm receptacle (or lip product container). In the figures, the dashed lines divide the lip balm receptacle into various portions, for example, FIGS. 7A-7G have 6 different portions as indicated by the dashed lines whereas FIGS. 11A-11G have 10 different portions. In some embodiments, one or more of the portions may be utilized as part of an embodiment of a lip balm receptacle described herein without the need to utilize the remaining portions of the lip balm receptacle. In addition, the dashed lines may also divide certain features (or apertures) into two or more portions of a feature (or aperture) that define their own design elements or portions thereof. In certain embodiments, one or more of the features (or apertures) and/or portions thereof may, for example, be utilized as part of an embodiment of a lip balm receptacle described herein independent of or without regard to the remaining features on the lip balm receptacle.
Figure 7B:
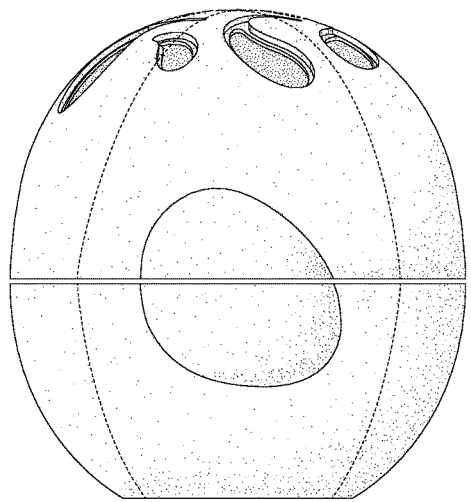
Figure 7C:
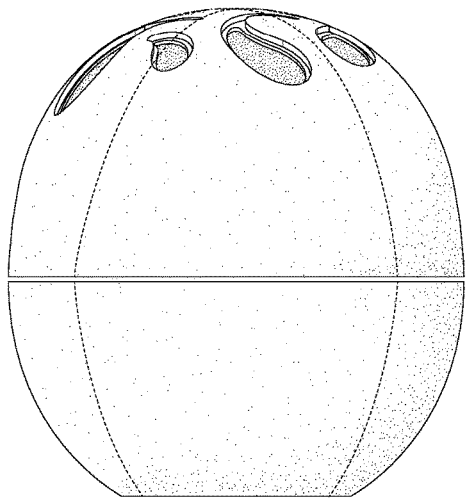
Figure 7D:
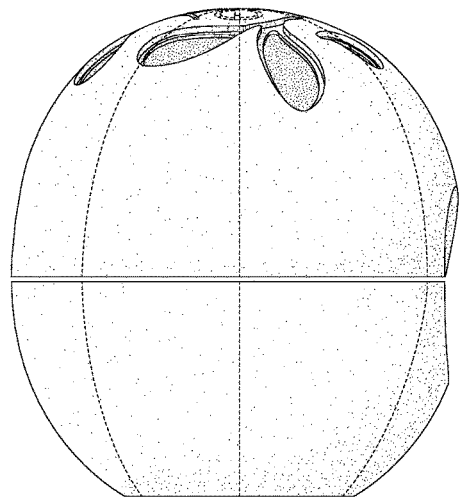
Figure 7E:
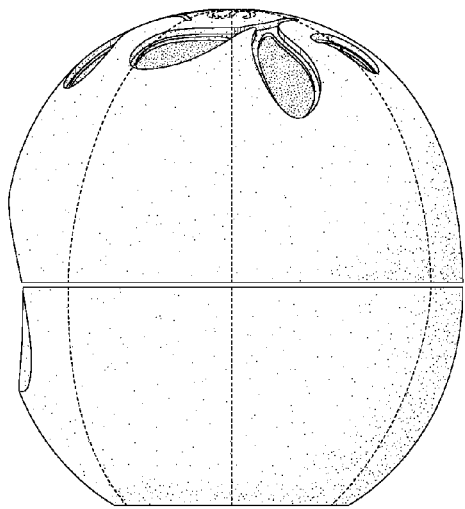
Figure 7F:
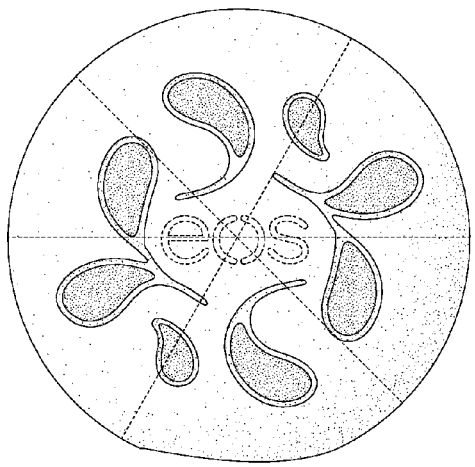
Figure 7G:
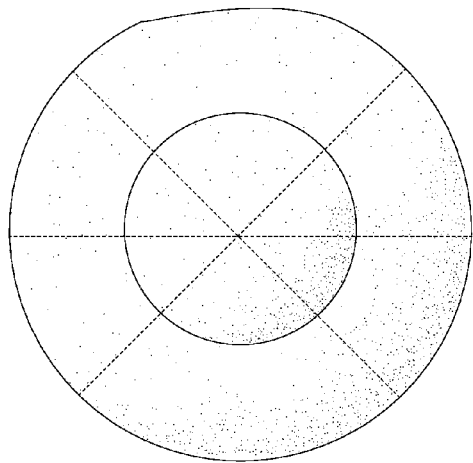
Figure 8A:
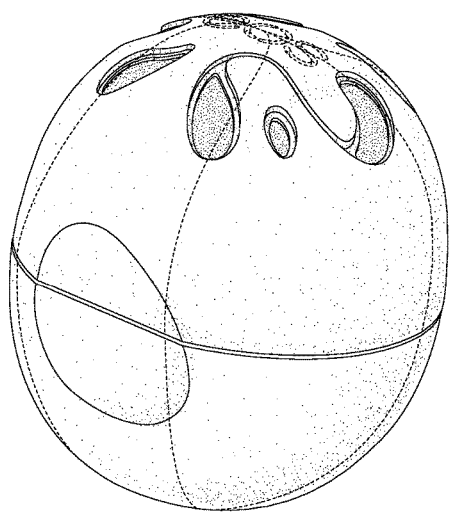
Figure 8B:
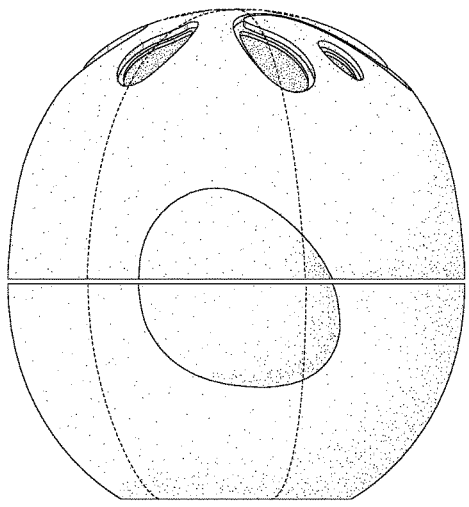
Figure 8C:
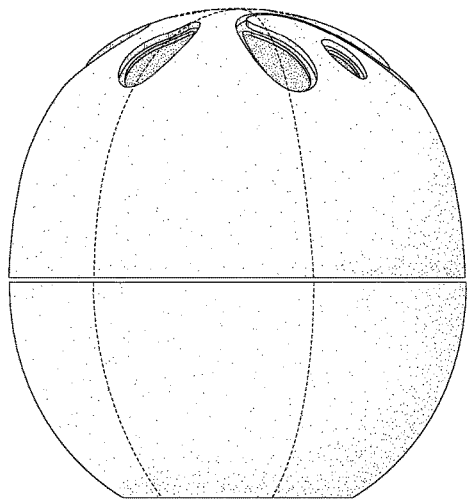
Figure 8D:
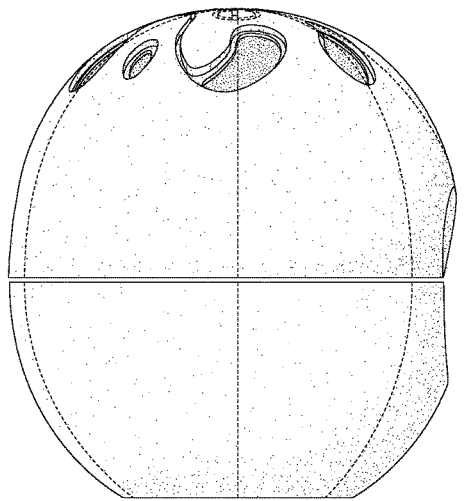
Figure 8E:
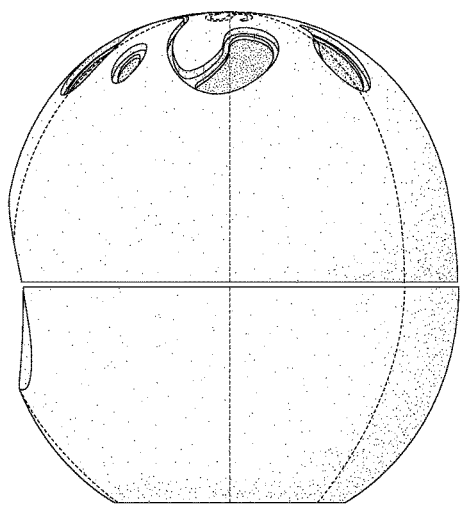
Figure 8F:
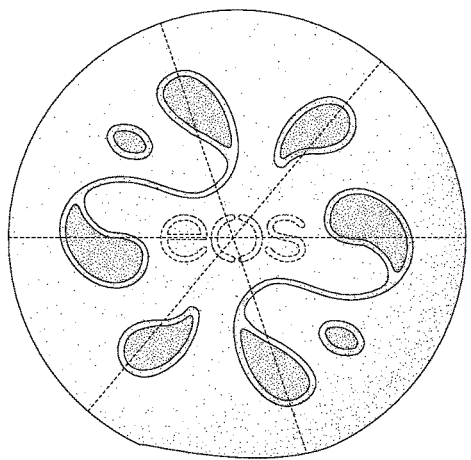
Figure 8G:
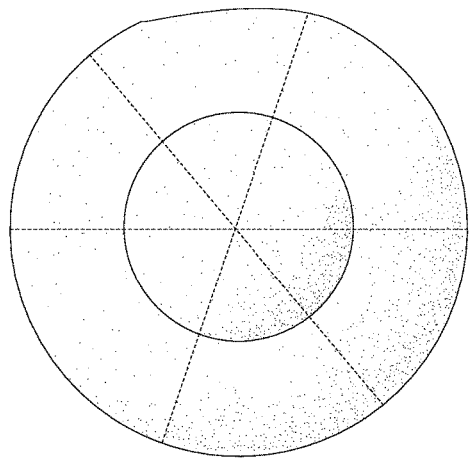
Figure 9A:
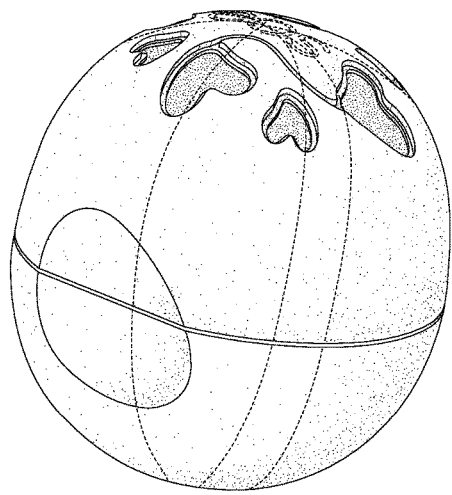
Figure 9B:
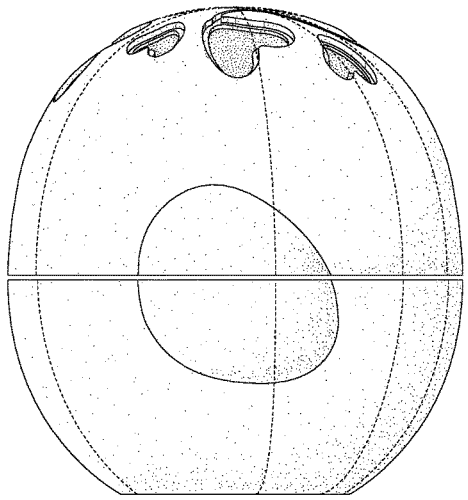
Figure 9C:
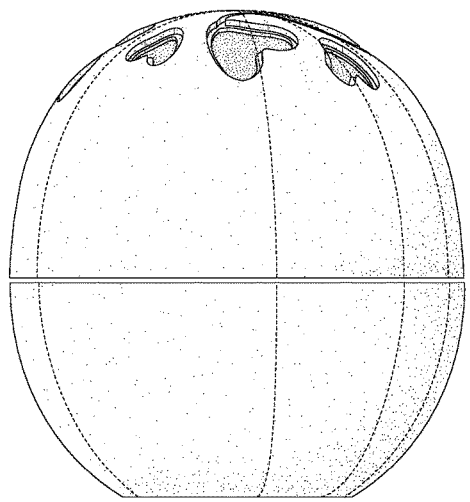
Figure 9D:
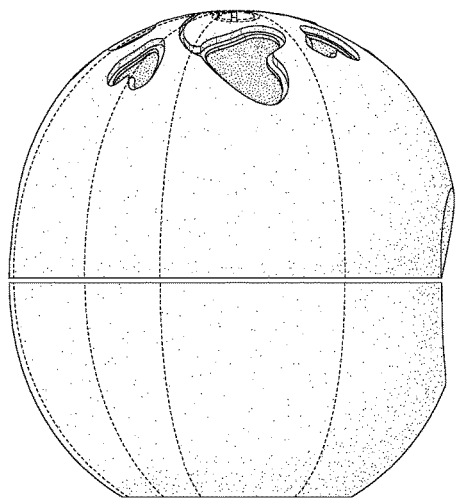
Figure 9E:
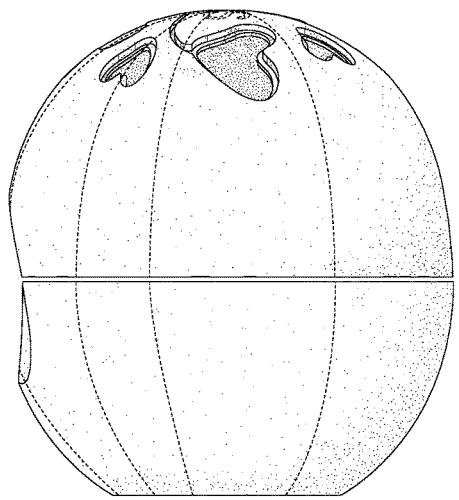
Figure 9F:
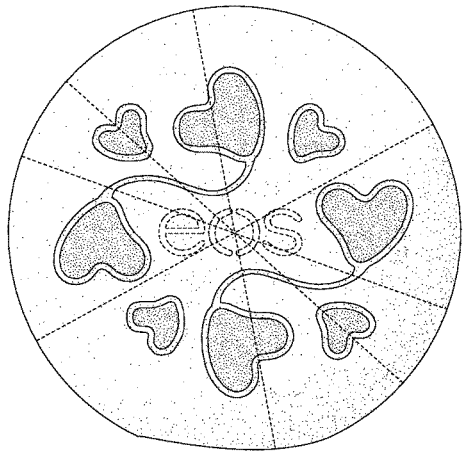
Figure 9G:
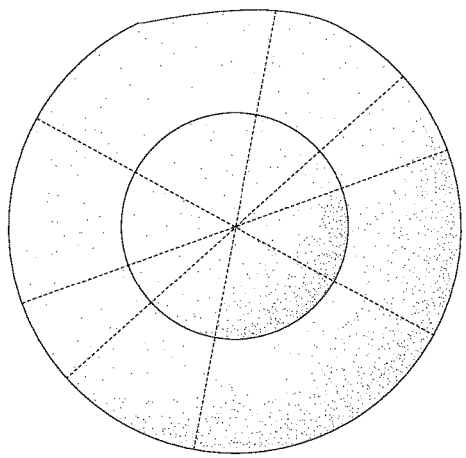
Figure 10A:
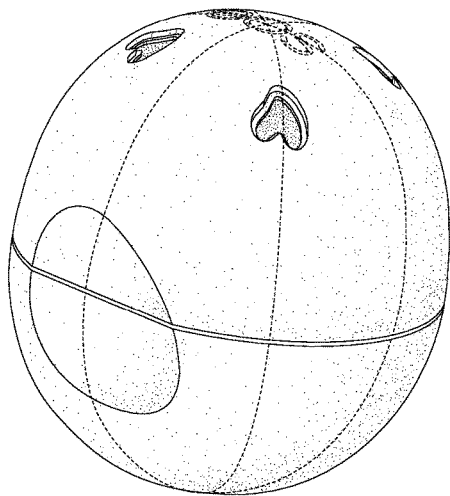
Figure 10B:
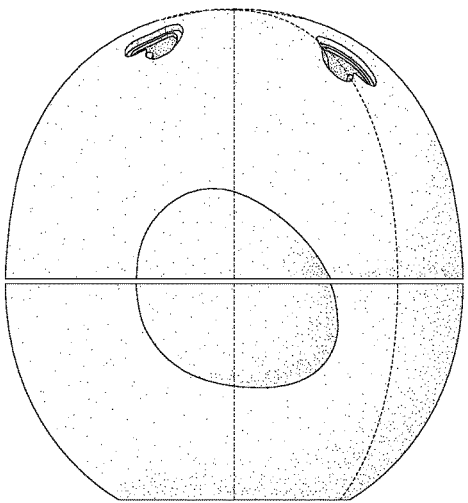
Figure 10C:
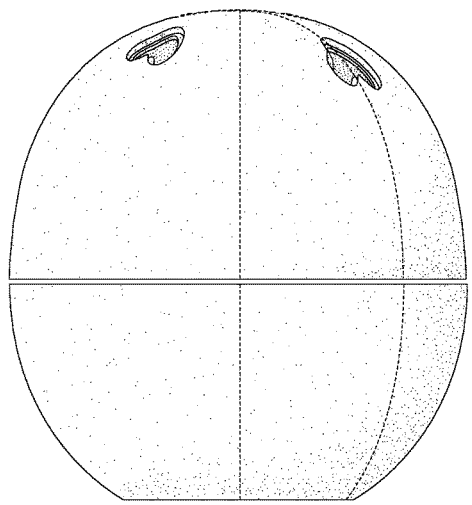
Figure 10D:
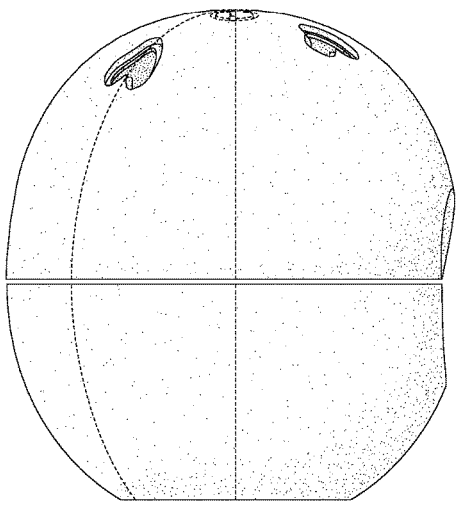
Figure 10E:
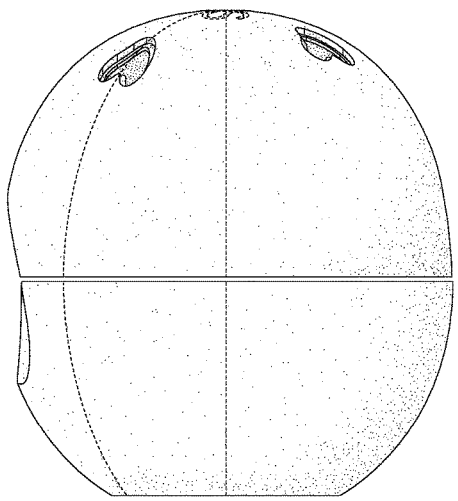
Figure 10F:
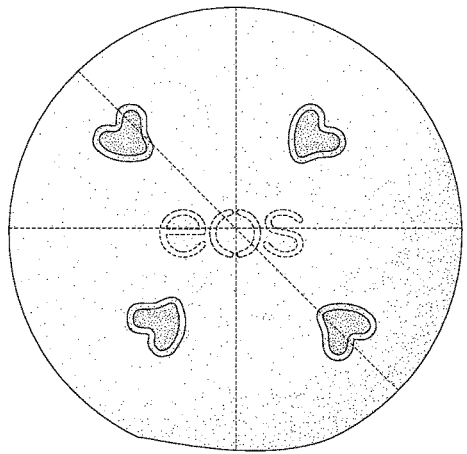
Figure 10G:
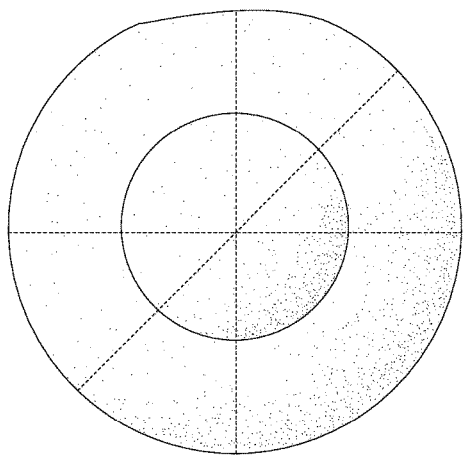
Figure 11A:
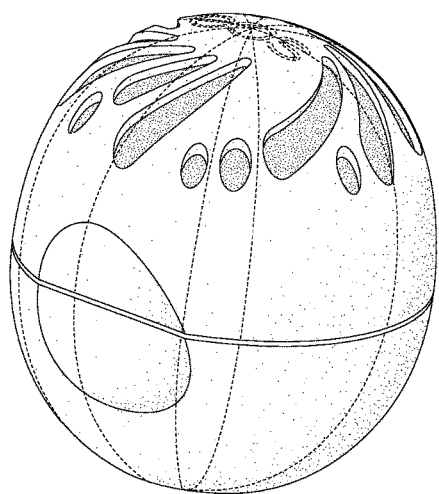
Figure 11B:
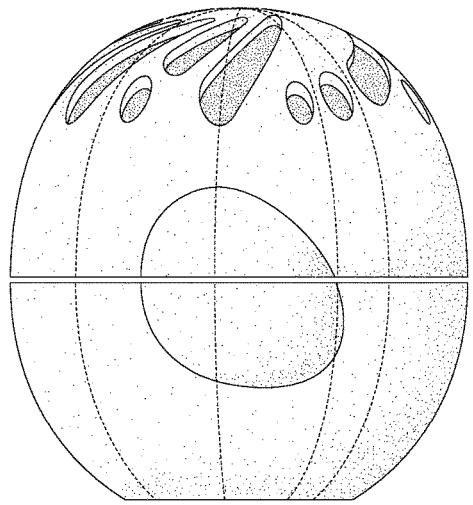
Figure 11C:
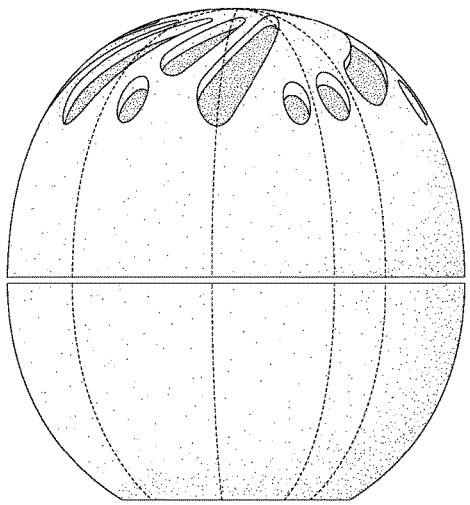
Figure 11D:
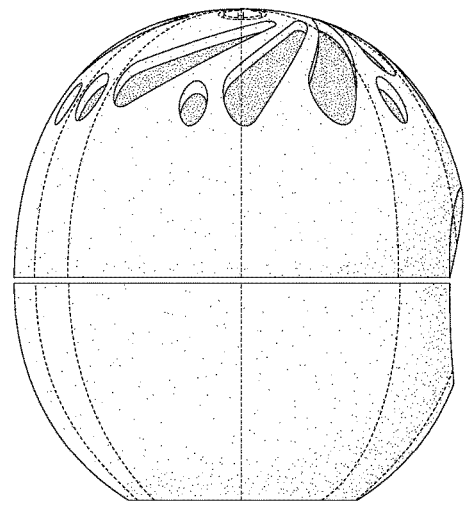
Figure 11E:
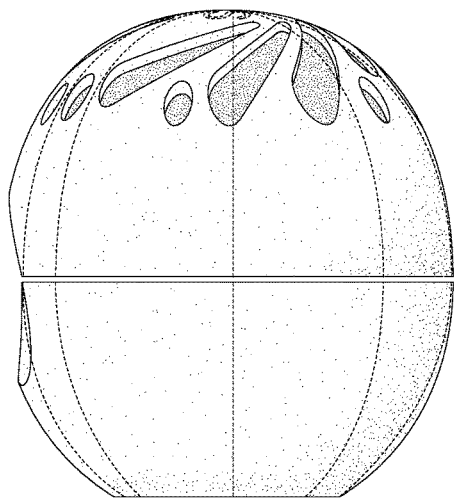
Figure 11F:
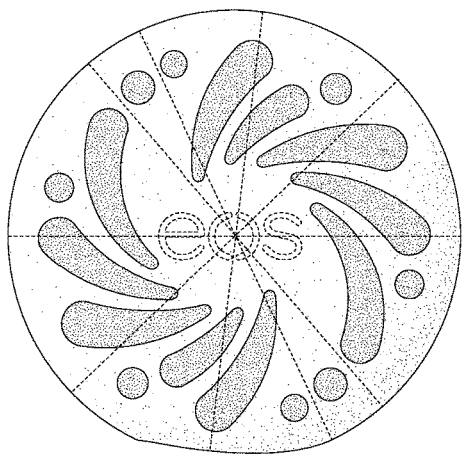
Figure 11G:
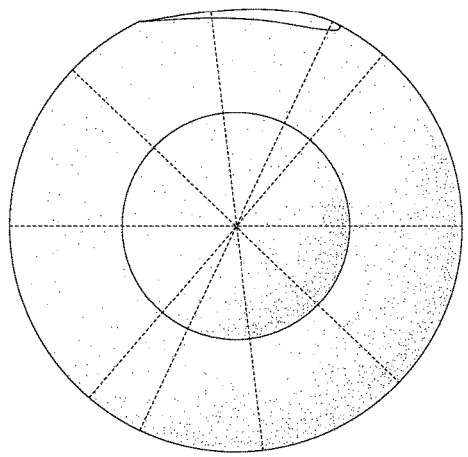

For purposes of illustration and without any loss of generality, for example, FIGS. 6A-6B illustrates a portion of the exterior layer 44 having an average thickness $\tau$ positioned between a first aperture 42 and a second aperture 46, each of said apertures defining respective portions of the outer surface of the interior layer that are not in contact with the exterior layer. The first aperture 42 has an associated surface area $A_1$ defined as the surface area of said exterior layer-free portion defined by the first aperture. The second aperture 46 has an associated surface area $A_2$ defined as the surface area of said exterior layer-free portion defined by the second aperture. As shown in FIG. 5B, between the two apertures is a portion of the outer surface of the interior layer 48 covered by the exterior layer. In certain embodiments, said portion of the outer surface of the interior layer 48 may be the portion of the outer surface of the interior layer bounded by (a) the first aperture, (b) the second aperture, and (c) projection lines 50 and 52 of the smallest projection (i.e., the projection having the smallest surface area, $A_M$) of the smaller aperture onto the larger of the two apertures wherein the projection lines 50 and 52 are equidistant in relation to one another. In certain embodiments, the portion of the exterior layer 44 between the first aperture 42 and the second aperture 46 may be the portion of the exterior layer $M_{12}$ that is normal to portion of the outer surface of the interior layer 48 covered by the exterior layer. If, for example, $A_1=3$ mm$^2$, $A_2=15$ mm$^2$, $A_M=7$ mm$^2$, and $\tau=2$ mm, then the durability metric may be computed as follows:

$$DM_{12} = \frac{7 \text{ mm}^2}{(7 \text{ mm}^2 + 2 \times \min(3 \text{ mm}^2, 15 \text{ mm}^2))} \times [2 \text{ mm}]^{-1} \approx 0.269$$

The parameters $\tau$, $A_1$, $A_2$ and $A_M$ may be determined for any pair of apertures present on a lip balm receptacle and therefore the durability metric $DM_{12}$ may be determined for the portion of the exterior layer between any two apertures, and not merely the specific case illustrated in FIGS. 6A-B.

In certain embodiments, said durability metric may be in the range of at least 0.001 mm$^{-1}$, for example at least 0.01 mm$^{-1}$, 0.02 mm$^{-1}$, 0.03 mm$^{-1}$, 0.04 mm$^{-1}$, 0.06 mm$^{-1}$, 0.08 mm$^{-1}$, 0.1 mm$^{-1}$, 1 mm$^{-1}$, or at least 4 mm$^{-1}$. In certain embodiments, the durability metric may be in the range of between 0.1 mm$^{-1}$ and 1 mm$^{-1}$, for example 0.5 mm$^{-1}$-1 mm$^{-1}$, 0.5 mm$^{-1}$-2 mm$^{-1}$, 0.3 mm$^{-1}$-2 mm$^{-1}$, or 0.5 mm$^{-1}$-3 mm$^{-1}$, In exemplary embodiments, the durability of the exterior layer of the lip balm receptacle may be characterized. In certain embodiments, said characterization may be based on the computation of a durability metric for each pair of apertures of the durable cutout design. In certain embodiments, a metric for the durability of the exterior layer of the upper portion of the lip balm receptacle may be the smallest of a group of durability metric, wherein the group comprises a durability metric computed for each pair of apertures of the durable cutout design. For example the durability metrics $DM_{12}$, $DM_{13}$, and $DM_{23}$ may be computed for a lip balm receptacle comprising a durable cutout design that has 3 apertures. In certain embodiments, the metric for the durability of the exterior layer of the upper portion of the lip balm receptacle may be the value of the smallest durability metric from among the durability metrics computed for each pair of apertures of the durable cutout design, for example a value equal to $\min(DM_{12}, DM_{13}, DM_{23})$ for a lip balm receptacle comprising a durable cutout design that has 3 apertures.

Exemplary embodiments may provide a single two-step overmolding injection method for rapidly manufacturing a plurality of the lip balm receptacles, each of said receptacles comprising a curved, multi-layered upper portion. In certain embodiments, the curved, multi-layered upper portion of each of the plurality of lip balm receptacles may comprise: 1) an interior layer having an outer surface that identifies the lip balm color or lip balm flavor contained in the lip balm receptacle; and 2) an exterior layer having: A) an outer surface with a different texture, material, and/or visual appearance than the outer surface of the interior layer; and B) a durable cutout design positioned about a debossed logo, said durable cutout design comprising a plurality of apertures through said exterior layer exposing the outer surface of the interior layer. In certain embodiments, a smallest durability metric $DM_{12}$ between any aperture 1 and any aperture 2 of the plurality of apertures may be in the range of 0.1-1 mm$^{-1}$. In certain embodiments, a smallest durability metric $DM_{12}$ between any aperture 1 and any aperture 2 of the plurality of apertures may be at least 0.001 mm$^{-1}$, for example at least 0.01 mm$^{-1}$, 0.02 mm$^{-1}$, 0.03 mm$^{-1}$, 0.04 mm$^{-1}$, 0.06 mm$^{-1}$, 0.08 mm$^{-1}$, 0.1 mm$^{-1}$, 0.2 mm$^{-1}$, 0.3 mm$^{-1}$, 0.5 mm$^{-1}$, 1 mm$^{-1}$, 2 mm$^{-1}$ or at least 4 mm$^{-1}$. In certain embodiments, a defect rate of less than 1%, for example less than 0.5%, 0.1%, 0.075%, 0.05%, or less than 0.005%, may be achieved by the method wherein no one aperture of the durable cutout design has a minimum dimension of less than 0.5 mm, for example a minimum dimension of less than 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or less than 3.0 mm. In certain embodiments, a defect rate of less than 1%, for example less than 0.5%, 0.1%, 0.075%, 0.05%, or less than 0.005%, may be obtained by the method, wherein each of the apertures of the durable cutout design are located at a polar angle θ (theta) of less than 60 degrees, for example less than 55 degrees, 50 degrees, 49 degrees, 48 degrees, 47 degrees, 46 degrees, 45 degrees, 44 degrees, 43 degrees, 42 degrees, 41 degrees, or less than 40 degrees. In certain embodiments, a defect rate of less than 1%, for example less than 0.5%, 0.1%, 0.075%, 0.05%, or less than 0.005%, may be obtained by the method, wherein the minimum dimension of any aperture and the largest polar angle θ (theta) is at least 0.5 mm and no more than 60 degrees, for example at least 0.5 mm and no more than 55 degrees, at least 0.5 mm and no more than 45 degrees, at least 0.5 mm and no more than 40 degrees, at least 1.0 mm and no more than 55 degrees, at least 1.0 mm and no more than 45 degrees, at least 1.0 mm and no more than 40 degrees, at least 2.0 mm and no more than 55 degrees, at least 2.0 mm and no more than 45 degrees, or at least 2.0 mm and no more than 40 degrees.

In exemplary embodiments, the exterior layer 18 (see FIG. 1) of the lip balm receptacle 10 is formed such that the distance between any two apertures 24 is greater than the thickness the exterior layer. This provides durability of the exterior layer such that portions of the exterior layer may not be easily torn from the interior layer.

In exemplary embodiments, the exterior 18 (see FIG. 1) layer may not be torn from the interior layer 14 for the lifetime of the lip balm receptacle. In exemplary embodiments, the exterior layer 18 may not be torn from the interior layer 14 for the usable lifetime of the lip balm receptacle. In exemplary embodiments, the exterior layer 18 and the interior layer 14 may be coupled together via a bond formed during the single two-step overmolding injection process.

In exemplary embodiments, the exterior layer 18 may be in direct contact with the interior layer 14 such that the bottom surface of the exterior layer is in direct contact with the outer surface of said interior layer. In exemplary embodiments, the exterior layer 18 may be in direct contact with the decorative interior layer 14 such that the bottom surface of the exterior layer 18 may be in direct contact with the outer surface of said decorative interior layer 14.

In exemplary embodiments, a portion of the at least one aperture 24 may be defined by: i) a first portion of the exterior layer 18 having a length of at least 5 mm and a width of greater than the exterior layer thickness and no more than 3 mm; and ii) a second portion of the exterior layer 18, opposing said first portion of said exterior layer, having a length of at least 5 mm and a width of greater than the exterior layer thickness and no more than 3 mm.

In exemplary embodiments, the surface of the interior layer 14 (see FIG. 1) may be smooth or glossy. In exemplary embodiments, the surface of the interior layer 14 may be polypropylene. In exemplary embodiments, the surface of the interior layer 14 may be visibly distinct from, of a different color, or of a same color as the surface of the exterior layer 18. In exemplary embodiments, the surface of the exterior layer 18 may be soft touch or matte finish. In exemplary embodiments, the surface of the exterior layer 18 may be thermoplastic elastomer. In exemplary embodiments, the surface of the exterior layer 18 may be visibly distinct from, of a different color, or of a same color as the surface of the interior layer 14.

In exemplary embodiments, the debossed logo 20 (see FIG. 1) may be framed or centrally positioned by the durable cutout design. In exemplary embodiments, the debossed logo 20 may be recessed by at least 0.25 mm, 0.5 mm, or 0.75 mm, relative to the outer surface of the exterior layer.

In exemplary embodiments, the interior layer 14 (see FIG. 1) may have a uniform thickness. In exemplary embodiments, the interior layer 14 may have a varying thickness.

In exemplary embodiments, the exterior layer 18 (see FIG. 1) may have a uniform thickness. In exemplary embodiments, the exterior layer 18 (see FIG. 1) may have a varying thickness.

In exemplary embodiments, the thickness of the exterior layer 18 (see FIG. 1) may be the narrowest dimension of said exterior layer 18. In exemplary embodiments, the thickness of the exterior layer 18 may be narrower than the smallest width of the at least one aperture 24 through said exterior layer 18. In exemplary embodiments, the thickness of the exterior layer 18 may be narrower than the smallest width of any of the plurality of apertures 24 through said exterior layer 18.

In exemplary embodiments, the thickness of the exterior layer may be at least 0.25 mm. In exemplary embodiments, the thickness of the exterior layer may be no more than 4 mm.

In exemplary embodiments, the exposed interior layer may be the sole identifier or visual indicia of the lip balm flavor when said lip balm receptacle is closed. In exemplary embodiments, the appearance of the exposed interior layer may be the sole identifier or visual indicia of the lip balm 16 flavor when said lip balm receptacle is closed. In exemplary embodiments, the color of the exposed interior layer 14 may be the sole identifier or visual indicia of the lip balm 16 flavor when said lip balm receptacle 10 is closed.

In exemplary embodiments, the plurality of apertures 24 may occupy between 5-50%, 10-50%, 20-50%, 30-50%, 15-45%, or 40-50%, of the surface area within a polar angle θ (theta) of between 5-60 degrees of the curved, multi-layered upper portion.

In exemplary embodiments, the surface area of the exterior layer 18 to the exposed interior layer of the curved, multi-layered upper portion may be 95-50:5-50.

In exemplary embodiments, the surface of the exposed interior layer 14 may be recessed relative to the outer surface of the exterior layer.

In exemplary embodiments, the exterior layer 18 may protect said exposed outer surface of the interior layer 14. In exemplary embodiments, the exterior layer 18 may protect said exposed outer surface of the interior layer 14 from degradation. In exemplary embodiments, the exterior layer 18 may protect said exposed outer surface of the interior layer 14 from wear and tear.

In exemplary embodiments, the durable cutout design 22 may be located to a polar angle θ (theta) of between 10-60 degrees spanning an azimuthal angle φ (phi) of between 5-360 degrees, 50-360 degrees, 100-360 degrees, 180-360 degrees, 270-360 degrees, or 90-270 degrees, of the curved, multi-layered upper portion.

In exemplary embodiments, at least a portion of the interior layer 14 may be exposed or outwardly visible when the receptacle is closed.

In exemplary embodiments, at least 5%, at least 10%, at least 20%, or at least 30%, of the interior layer 14 may be exposed or outwardly visible when the receptacle is closed.

In exemplary embodiments, no more than 60%, no more than 50%, or no more than 40%, of the interior layer 14 may be exposed or outwardly visible when the receptacle is closed.

In exemplary embodiments, the exterior layer 18 may cover less than the entirety of the interior layer of said curved, multi-layered upper portion when the receptacle 10 is closed.

In exemplary embodiments, the exterior layer 18 may cover no more than 98%, 95%, 90%, 85%, 80%, 75%, 70%, 65%, 60%, 55%, 50%, 45%, 40%, 35%, 30%, 25%, or 20%, of the interior layer of said curved, multi-layered upper portion when the receptacle 10 is closed.

In exemplary embodiments, the exposed interior layer 14 may be outwardly visible when the receptacle is closed.

In exemplary embodiments, the ratio of the surface area of the outer surface of the exterior layer 18 to the exposed outer surface of the interior layer 14 of the curved, multi-layered upper portion may be at least 1:1, at least 60:40, at least 70:30, at least 80:20, at least 90:10, or at least 95:5, when the receptacle 10 is closed.

In exemplary embodiments, the ratio of the surface area of the outer surface of the exterior layer 18 to the exposed outer surface of the interior layer 14 of the curved, multi-layered upper portion may be no more than 97:3, no more than 95:5, no more than 90:10, no more than 85:15, or no more than 75:25, when the receptacle 10 is closed.

In exemplary embodiments, the ratio of the surface area of the outer surface of the exterior layer 18 to the exposed outer surface of the interior layer 14 of the curved, multi-layered upper portion between the polar angle θ (theta) of 5-60 degrees may be at least 90:10, at least 80:20, at least 70:30, at least 60:40, at least 1:1, at least 40:60, at least 30:70, or at least 20:80, when the receptacle 10 is closed.

In exemplary embodiments, the ratio of the surface area of the outer surface of the exterior layer 18 to the exposed outer surface of the interior layer 14 of the curved, multi-layered upper portion 12 between the polar angle θ (theta) of 5-60 degrees may be no more than 90:10, no more than 80:20, no more than 70:30, no more than 60:40, or no more than 1:1, when the receptacle 10 is closed.

In exemplary embodiments, the single two-step overmolding injection process for the curved, multi-layered upper portion may take less than 1 min, for example, less than 30 seconds, 20 seconds, 15 seconds, 12 seconds, 10 seconds, between 5 and 15, between 3 and 8 seconds, or less than 8 seconds.

In exemplary embodiments, the curved, multi-layered upper portion comprising the durable cutout design 22 may be formed by the single two-step overmolding injection process repeatedly, at high-speed, efficiently, consistently, or combinations thereof. In exemplary embodiments, the interior layer may be prepared from a first plastic. In exemplary embodiments, the exterior layer may be prepared from a second plastic. In exemplary embodiments, the first plastic may have an appearance different from the second plastic. In exemplary embodiments, the first plastic may have a color different from the second plastic. In exemplary embodiments, the interior layer may be prepared from a first plastic mixture. In exemplary embodiments, the exterior layer may be prepared from a second plastic mixture.

In exemplary embodiments, the first plastic may be iridescent. In exemplary embodiments, the first plastic may be at least semi-transparent. In exemplary embodiments, the first plastic may be translucent. In exemplary embodiments, the first plastic may be pearlescent. In exemplary embodiments, the first plastic may be white. In exemplary embodiments, the first plastic may be off-white. In exemplary embodiments, the first plastic may be pink. In exemplary embodiments, the first plastic may have a reflective finish. In exemplary embodiments, the second plastic may be gold. In exemplary embodiments, the second plastic may be silver. In exemplary embodiments, the second plastic may be white. In exemplary embodiments, the second plastic may be black. In exemplary embodiments, the second plastic may have a flat finish. In exemplary embodiments, the second plastic may have a non-slip surface.

In exemplary embodiments, the interior layer 14 (see FIG. 1) and the exterior layer 18 may be visibly distinct. In exemplary embodiments, the interior layer and the exterior layer may have different appearances. In exemplary embodiments, the interior layer and the exterior layer may have different colored materials.

In exemplary embodiments, the interior layer 14 may be different in color than the exterior layer 18, as measured by colorimetry.

In exemplary embodiments, the interior layer 14 may be at least 0.2 to 0.8, for example at least 0.3, 0.4, or 0.5, units of absorbance different in color than the exterior layer 18, as measured by colorimetry.

In exemplary embodiments, the interior layer 14 surface may have a glossy finish and the exterior layer 18 surface may have a flat finish.

In exemplary embodiments, the appearance of the first plastic may be substantially similar to the color of the lip balm 16.

In exemplary embodiments, the appearance of the first plastic may be similar to the color of the lip balm. In exemplary embodiments, the appearance of the first plastic may be identical to the color of the lip balm 16. In exemplary embodiments, the color of the first plastic may be substantially similar to the color of the lip balm 16. In exemplary embodiments, the color of the first plastic may be similar to the color of the lip balm. In exemplary embodiments, the color of the first plastic may be identical to the color of the lip balm. In exemplary embodiments, the first plastic and the lip balm 16 may be iridescent. In exemplary embodiments, the first plastic and the lip balm may be at least semi-transparent. In exemplary embodiments, the first plastic and the lip balm 16 may be pearlescent.

In exemplary embodiments, the lip balm receptacle 10 may be configured such that the first plastic may be capable of indicating the color of the lip balm 16 within the receptacle. In exemplary embodiments, the lip balm receptacle may be configured such that the first plastic is capable of indicating the flavor of the lip balm within the receptacle.

In exemplary embodiments, the durable cutout design 22 may comprise at least two apertures through said exterior layer 18 exposing the outer surface of the interior layer 14.

In exemplary embodiments, the durable cutout design 22 may comprise a plurality of apertures through said exterior layer exposing the outer surface of the interior layer.

In exemplary embodiments, the plurality of apertures 24 may comprise at least 3, 4, 5, 6, 7, 8, 9, 10, 11, 12, 13, 14, 15, 16, 17, 18, 19, or 20 apertures.

In exemplary embodiments, each of the plurality of apertures 24 may be located at a polar angle θ (theta) in the range of between 0 degrees and 60 degrees, for example in the range of 5 degrees and 60 degrees, 5 degrees and 55 degrees, 5 degrees and 50 degrees, 5 degrees and 45 degrees, 5 degrees and 40 degrees, or in the range of between 5 degrees and 35 degrees.

In exemplary embodiments, each of the plurality of apertures 24 may have a width of at least 0.5 mm, 0.75 mm, 1 mm, 1.25 mm, or 1.5 mm.

In exemplary embodiments, each of the plurality of apertures 24 may have a maximum width of at least 0.5 mm, 0.75 mm, 1 mm, 1.25 mm, or 1.5 mm.

In exemplary embodiments, a minimum distance between any two apertures 24 of the plurality of apertures may be, for example, at least 0.5 mm, 0.75 mm, 1 mm, 1.25 mm, or 1.5 mm, and no more than 2 mm.

In exemplary embodiments, a minimum distance between any two apertures 24 of the plurality of apertures may be, for example, at least 0.25 mm and no more than 4 mm, when at least one aperture of the two apertures has a maximum width of at least 0.5 mm.

In exemplary embodiments, a minimum distance between any two apertures 24 of the plurality of apertures may be, for example, at least 0.5 mm and no more than 2 mm, when at least one aperture of the two apertures has a maximum width of at least 0.5 mm.

In exemplary embodiments, a maximum distance between two adjacent apertures 24 of the plurality of apertures may be no more than 2 mm.

In exemplary embodiments, each aperture peripheral wall defined by said plurality of apertures 24 may be parallel to the longitudinal axis of said curved, multi-layered upper portion, plus or minus 1-10 degrees relative to the longitudinal axis.

In exemplary embodiments, each aperture 24 peripheral wall defined by said plurality of apertures may be parallel to the longitudinal axis of said curved, multi-layered upper portion.

In exemplary embodiments, each aperture peripheral wall 32 defined by said plurality of apertures 24 may be beveled. In exemplary embodiments, each aperture peripheral wall 32 defined by said plurality of apertures 24 may be stepped. In exemplary embodiments, each aperture peripheral wall 32 defined by said plurality of apertures may be substantially perpendicular to the exterior surface of the interior layer 14. In exemplary embodiments, each aperture peripheral wall 32 defined by said plurality of apertures may be perpendicular to the exterior surface of the interior layer 14. In exemplary embodiments, each aperture peripheral wall 32 defined by said plurality of apertures may be less than perpendicular to the exterior surface of the interior layer. In exemplary embodiments, each aperture peripheral wall 32 defined by said plurality of apertures may be substantially parallel to the direction of the pour point of the mold. In exemplary embodiments, each aperture peripheral wall 32 defined by said plurality of apertures may be parallel to the direction of the pour point of the mold.

In exemplary embodiments, a portion of the at least one aperture 24 of the plurality of apertures may be defined by: i) a first portion of the exterior layer 18 having a length of at least 5 mm and a width of greater than the exterior layer thickness and no more than 3 mm; and ii) a second portion of the exterior layer 18, opposing said first portion of said exterior layer 18, having a length of at least 5 mm and a width of greater than the exterior layer thickness and no more than 3 mm.

In exemplary embodiments, a portion of the at least one aperture 24 of the plurality of apertures may be defined by: i) a first portion of the exterior layer 18 having a length of at least 5 mm and a width ranging between 1-3 mm; and ii) a second portion of the exterior layer 18, opposing said first portion of said exterior layer, having a length of at least 5 mm and a width ranging between 1-3 mm.

In exemplary embodiments, a portion of the at least one aperture 24 of the plurality of apertures may be defined by: i) a first portion of the exterior layer 18 having a length of at least 5 mm, a narrowest width of between 1-1.5 mm, and a widest width of between 1.6-3 mm; and ii) a second portion of the exterior layer 18, opposing said first portion of said exterior layer, having a length of at least 5 mm, a narrowest width of between 1-1.5 mm, and a widest width of between 1.6-3 mm.

In exemplary embodiments, a portion of the at least one aperture 24 of the plurality of apertures may be defined by: i) a first portion of the exterior layer 18 having a length of at least 5 mm and a uniform width of between 1-2 mm; and ii) a second portion of the exterior layer 18, opposing said first portion of said exterior layer, having a length of at least 5 mm and a uniform width of between 1-2 mm.

In exemplary embodiments, at least a first aperture 24 and at least a second aperture 24 of the plurality of apertures may be positioned within a polar angle θ (theta) of between 5-60 degrees over an azimuthal angle φ (phi) of between 10-25 degrees.

In exemplary embodiments, at least a first aperture 24 and at least a second aperture 24 of the plurality of apertures may be positioned within a polar angle θ (theta) of between 5-60 degrees over an azimuthal angle φ (phi) of between 10-25 degrees.

In exemplary embodiments, the surface of the interior layer exposed by at least a first aperture and the surface of the interior layer exposed by at least a second aperture of said plurality of apertures through said exterior layer may be positioned within a polar angle θ (theta) of between 5-60 degrees over an azimuthal angle φ (phi) of between 10-25 degrees.

In exemplary embodiments, the surface of the interior layer 14 exposed by at least a first aperture 24 and the surface of the interior layer 14 exposed by at least a second aperture 24 of said plurality of apertures through said exterior layer 18 may be positioned within a polar angle θ (theta) of between 5-60 degrees over an azimuthal angle φ (phi) of between 10-25 degrees.

In exemplary embodiments, the first plastic may be selected from the group consisting of: thermoplastic, polypropylene, polyethylene, polylactide, and polyvinyl chloride.

In exemplary embodiments, the second plastic may be selected from the group consisting of: thermoplastic elastomer, styrenic block copolymers, thermoplastic olefins, thermoplastic polyurethanes, thermoplastic copolyester, thermoplastic polymides, and polymer blend.

Exemplary embodiments may provide for a method of forming a lip product container, for example a multi-layered lip balm receptacle, comprising: A) forming a multi-layered container having an upper part and a lower part that connect to form an enclosure, whereby the upper part is formed by (i) injection molding of a first plastic into a die defining a curved first layer of the upper part; and (ii) within 8 seconds, for example between 3 and 8 seconds, or in less than 5 seconds, of forming the first layer, forming a second layer by injecting a second plastic onto at least one curved surface of the first layer, and B) forming a lower part by injection molding; wherein the multi-layered upper part comprises a durable cutout design comprising at least one aperture through said second layer that exposes an outer surface of the interior layer.

Exemplary embodiments may provide for a method of forming a lip care product, for example a lip balm product, comprising: A) forming a multi-layered container having an upper part and a lower part that connect to form an enclosure, whereby the upper part is formed by (i) injection molding of a tough, smooth-finished plastic into a die defining a continuously curved interior layer of the upper part to form a smooth finished interior layer having an outer surface of a pre-determined visual appearance; and (ii) within a period of time before the interior layer cools to room temperature and/or cures, overmolding an exterior layer onto the outer surface of the interior layer by injecting a less tough plastic forming an outer surface on the exterior layer that is less smooth (grippier) than the interior layer outer surface, and B) forming a lower part by injection molding; wherein the multi-layered upper part comprises a durable cutout design comprising a plurality of apertures through said exterior layer that expose the outer surface of the interior layer.

Exemplary embodiments may provide for a method of forming a lip balm receptacle having a curved, multi-layered upper portion by a single two-step overmolding injection process, comprising: i) injecting a first plastic into a first die to form a interior layer; and ii) within 8 seconds, for example between 3 and 8 seconds, or in less than 5 seconds of forming the interior layer, forming an exterior layer having a durable cutout design, by: a) transferring the formed interior layer into a second die; and b) injecting a second plastic into the second die directly on the exterior surface of the formed interior layer to form said exterior layer; wherein the curved, multi-layered upper portion comprises: 1) the interior layer having an outer surface that identifies the lip balm color or lip balm flavor contained in the lip balm receptacle; and 2) the exterior layer having: A) an outer surface with a different texture, material, and/or visual appearance than the outer surface of the interior layer; and B) the durable cutout design position about a debossed logo, said durable cutout design comprising at least one aperture through said exterior layer exposing the outer surface of the interior layer.

In exemplary embodiments, the exterior layer having a durable cutout design is formed within 8 seconds, for example between 3 and 8 seconds, or in less than 5 seconds of forming the interior layer.

In exemplary embodiments, the at least one aperture peripheral wall defined by said at least one aperture may be substantially parallel to the direction of movement of the second die.

In exemplary embodiments, the at least one aperture peripheral wall defined by said at least one aperture may be parallel to the direction of movement of the second die.

In exemplary embodiments, the at least one aperture peripheral wall defined by said at least one aperture may be formed by a single direction of movement of the second die.

In exemplary embodiments, said durable cutout design may comprise at least two apertures through said exterior layer exposing the outer surface of the interior layer.

In exemplary embodiments, said durable cutout design may comprise a plurality of apertures through said exterior layer exposing the outer surface of the interior layer.

In exemplary embodiments, the plurality of apertures may comprise at least 2, 3, 4, 5, 6, 7, 8, 9, 10, 11, 12, 13, 14, 15, 16, 17, 18, 19, 20, 21, 22, 23, 24. or 25 apertures.

In exemplary embodiments, each aperture peripheral wall defined by said plurality of apertures may be substantially parallel to the direction of movement of the second die.

In exemplary embodiments, each aperture peripheral wall defined by said plurality of apertures may be parallel to the direction of movement of the second die. In exemplary embodiments, each aperture peripheral wall defined by said plurality of apertures may be formed by a single direction of movement of the second die. In exemplary embodiments, the interior layer may be a curved interior layer. In exemplary embodiments, the exterior layer may be a curved exterior layer. In exemplary embodiments, the first plastic may be selected from the group consisting of: thermoplastic, polypropylene, polyethylene, polylactide, and polyvinyl chloride. In exemplary embodiments, the second plastic may be selected from the group consisting of: thermoplastic elastomer, styrenic block copolymers, thermoplastic olefins, thermoplastic polyurethanes, thermoplastic copolyester, thermoplastic polymides, and polymer blend.

In exemplary embodiments, the method further may comprise forming the at least one aperture, said forming the at least one aperture comprising: contacting the second die with at least a portion of the outer surface of the interior layer prior to injecting the second plastic through a pour point. In certain embodiments, the second die may contact at least 5% of the outer surface of the interior layer, for example at least 10%, 15%, 20%, 25%, 30%, 35%, 40%, 45%, or at least 50% of the outer surface of the interior layer. In certain embodiments, the second die may contact no more than 5% of the outer surface of the interior layer, for example no more than 10%, 15%, 20%, 25%, 30%, 35%, 40%, 45%, or no more than 50% of the outer surface of the interior layer.

In certain embodiments, the second plastic is injected through the pour point at a specified pressure. In certain embodiments, the pour point pressure may be in the range of 10-300 p.s.i.g., for example 10-20 p.s.i.g., 20-50 p.s.i.g., 50-75 p.s.i.g., 75-100 p.s.i.g., 100-125 p.s.i.g., 125-150 p.s.i.g., or in the range of 150-200 p.s.i.g. In certain further embodiments, the second die may contact the outer surface of the interior layer at a minimum pressure of at least 100% of the specified pour point pressure, for example at least 101%, 105%, 110%, 120%, 130%, 140%, 150% or at least 200% of the specified pour point pressure. In other further embodiments, the second die may contact the outer surface of the interior layer at a minimum pressure of less than 100% of the specified pour point pressure, for example less than 99%, 95%, 90%, 85%, 80%, 70%, 50% or less than 20% of the specified pour point pressure.

Embodiments of the Lip Balm Composition

In exemplary embodiments, a suitable lip balm composition may include one or more waxes, for example waxes such as lanolin wax, candelilla wax, spermaceti, cocoa butter, karite butter, silicon waxes, hydrogenated oils which are solid at room temperature, sucroglycerides, oleates, myristates, linoleates, stearates, paraffin, beeswax, carnauba wax, ozokerite, candelilla wax, or microcrystalline wax. In exemplary embodiments, a suitable lip balm composition may include a wax, such as a "natural" product wax, or a petroleum-derived wax (sometimes referred to as a synthetic product or synthetic wax). For example, a "natural" wax may include a beeswax or plant derived wax, such as candelilla wax, camauba wax (palm wax), coconut wax, jojoba wax, or soy wax.

In exemplary embodiments, a suitable lip balm composition may include one or more wax esters, such as lanolin and its derivatives, perhydrosqualenc and saturated esters, ethyl palrnitate, isopropyl palrnitate, alkyl myristatcs such as isopropyl myristate, butyl myristate and decyl myristate, hexyl stearate, triglyceride esters, triglycerides of octanoic and decanoic acid, cetyl ricinoleate, stearyl octanoate (Purcellin oil), fatty acids, polyhydric alcohols, polyether derivatives, fatty acid monoglycerides, polyethylene gylcol, propylene glycol, alkyl ethoxy ether sulfonates, ammonium alkyl sulfates, fatty acid soaps, or hydrogenated polyisobutene.

In exemplary embodiments, a suitable lip balm composition may include one or more natural oils, such as natural essential oils, other natural organic oils including vegetable oil, citris oil, plant oil, fish oil, non-citris fruit oil, oils having flavors, perfume or scents, or combinations thereof. Suitable vegetable oils may include canola oil, corn oil, neem oil, olive oil, cottonseed oil, coconut oil, palm oil, nut oils, safflower oil, sesame oil, soybean oil, and sunflower oil. Nut oils may include peanut oil, almond oil, cashew oil, hazelnut oil, macadamia oil, pecan oil, pine nut oil, pistachio oil, and walnut oil. Citrus oils may include grapefruit seed oil, lemon oil, orange oil, tangerine oil, lime oil, mandarin oil, and the like. Other oils based on fruits, plants and fish may include fish oil, such as omega 3 oil, flaxseed oil (linseed oil), apricot oil, avocado oil, cocoa butter oil, coconut oil, hemp oil, *papaya* seed oil, rice bran oil, shea butter oil, tea tree seed oil, and wheat germ oil. Other oils may include lavender oil, rosemary oil, tung oil, jojoba oil, poppy seed oil, castor oil, mango oil, rose hip oil, tall oil. Essential oils may include chamomile oil, cinnamon oil, citronella oil, *eucalyptus* oil, fennel seed oil, jasmine oil, juniper berry oil, lavender oil, lemon grass oil, nutmeg oil, patchouli oil, peppermint oil, pine oil, rose oil, rose hip oil, rosemary oil, rosewood oil, sandalwood oil, *sassafras* oil, spearmint oil, and wintergreen oil.

In exemplary embodiments, a suitable lip balm composition may include one or more synthetic oils, such as silicon oil, for example dimethylpolysiloxane, petrolatum, a mineral oil (Vaseline oil), or other petroleum-based oil products.

In exemplary embodiments, a suitable lip balm composition may include one or more alkyl and alkenyl esters of fatty acids, such as isopropyl esters of myristic, palmitic and stearic acids and fatty esters which are solid at room temperature.

In exemplary embodiments, a suitable lip balm composition may include one or more fatty alcohols such as lauryl, cetyl, myristyl, stearyl, palrnityl and oleyl alcohols; polyoxyethylated fatty alcohols.

In exemplary embodiments, a suitable lip balm composition may include one or more additional ingredients, such as colorant (sometimes referred to as dye stuffs or pigments), perfumes, natural scents, fragrance materials, preservatives, vitamins, sensates, such as mint extracts, cinnamon extract, and capsaicin, natural medicaments, such as menthol, camphor, *eucalyptus*, salicylic acid, and derivatives of salicylic acid, botanical extracts, such as aloe vera, antioxidants, such as tocopherols, tocopheryl acetate, some botanical butters, and green tea extracts, additives that increase protection against sunburn, such as UV absorbers, coffee oil, derivatives of salicylic acid, derivatives of cinnamic acid, derivatives of para-aminobenzoic acid, derivatives of benzophenone, and derivatives of camphor, chelating agents such as gluconic, citric and tartaric acids, thickening agents such as cross-linked carboxyl polymethylene polymers, bentonite and gums, emulsifiers, water, or alcohol or acetone as necessary to achieve the desired cosmetic characteristics.

In exemplary embodiments, suitable lip balm composition may include one or more colorants that impart color to the composition, but the colorant should not be of an amount, particle size, and/or presented in a matrix that would permit transfer of colorant that imparts a color to the lips during application. In exemplary embodiments, natural colorants may be used, such as, plant extracts, natural minerals, or carmine.

In exemplary embodiments, a suitable lip balm composition may include one or more moisturizing oils, such as sunflower oil, coconut oil, castor oil, vegetable oil, corn oil, aloe vera oil, canola oil, soybean oil, jojoba oil, olive oil, babassu oil, avocado oil, apricot oil, meadowfoam seed oil, macadamia seed oil, oat kernel oil, palm seed oil, safflower oil, sandalwood oil, sesame oil, almond oil, wheat germ oil, or cranberry oil.

In exemplary embodiments, a suitable lip balm composition may include one or more botanical butters, such as mango seed butter, raspberry butter, avocado butter, shea butter, olive butter, kuku butter, monoi butter, peach butter, pistachio butter, coconut butter, cocoa butter, pomegranate butter, rose hip butter, sunflower butter, wheat germ butter, apricot butter, babassu butter, cupuacu butter, kokum butter, hazelnut butter, jojoba butter, sesame butter, soy butter, almond butter, meadowfoam seed butter, black current seed butter, or cranberry butter.

In exemplary embodiments, a suitable lip balm composition may include non-mammalian waxes, such as beeswax, camauba wax or candelilla wax, combined with a plurality of jobjoba esters, a plurality of butters and sunflower seed oil to form a composition that has a rich, soft, smooth feel when applied to the lips, moisturizing properties and sufficient structure as a composition to form a stick with sufficient robustness for commercial use.

In exemplary embodiments, a three part lip product container may be formed using a two-shot high speed injection molded process. The lip product container includes an upper portion which may act as a cap for the lip product, and a lower portion connected to a lip product support platform. The upper portion may be formed using a two shot injection molding process consisting of forming an interior layer in a first mold, allowing the interior layer to cool for less than 10 seconds, for example less than 5 seconds, or 3-5 seconds and forming a second layer in a second mold, wherein the interior layer may be visible through at least one aperture formed in the second layer. The lip product may be supported within the lip product container on the support platform. In exemplary embodiments, the color or texture of the interior layer which may be visible through the at least one aperture corresponds to the color or texture of the lip product. This correlation between the interior layer and the lip products may also include the use of color swirls or sparkles on the interior layer and the lip product. In exemplary embodiments, the shape of the at least one aperture correlates to the lip product.

In exemplary embodiments, a two-shot high speed injection molding process may be used to create a lip product container, for example a multi-layered lip balm receptacle. At least one major portion of the lip product container (i.e. the top half or the bottom half of the enclosure) may be formed of two layers: an interior layer and an exterior layer. The interior layer may be formed in a first mold of a material that may be either harder, more rigid, less grippy, smoother, or less expensive than the material used for the exterior layer. The interior layer may be allowed to cool, or cool partially, for less than 10 seconds, for example less than 5 seconds, or 3-5 seconds. The interior layer may then be transferred to a second mold to form the exterior layer. The second mold may be adapted such that less than the entirety of the interior layer is covered by the exterior layer material. By not covering the entirety of the interior layer with the exterior layer material, at least one aperture is formed in the exterior layer such that the interior layer may be visible. The exterior layer may also have more than one aperture that are spaced apart a distance at least as far as the exterior layer is thick. This provides a robust exterior layer that will not readily tear or detach. The color or texture of the interior layer that may be visible through the at least one aperture and may correspond to the color, flavor, or texture of the lip product.

In exemplary embodiments, the cap of the lip balm container may have an outer shell with two layer: an interior layer and an exterior layer. The bottom edge of the cap of the lip product container forms a plane with a central axis (34). The exterior layer has at least one aperture formed therein such that the interior layer may be visible through the aperture. The cap may be formed in a two-step overmolding process. The interior layer may be formed by injecting a first plastic into a first mold. The interior layer may then be allowed to cool for less than 10 seconds, for example less than 5 seconds, or 3-5 seconds. The first mold may then be removed (or partially removed or released) from the interior layer in a direction parallel to central axis 34. The exterior layer may then be formed by injecting a second plastic into a second mold. The exterior layer may then be allowed to cool for less than 10 seconds, for example less than 5 seconds, or 3-5 seconds. The first mold may then be removed from the exterior layer in a direction substantially parallel to the central axis (34). To ensure durability of the lip product, including but not limited to proper adhesion of the exterior layer to the interior layer, the at least one aperture is located a sufficient distance from the edge formed by the bottom edge of the cap. For example, the exterior layer surface of the cap may be defined by the bottom edge of the cap to the top of the cap wherein the central axis passes through. The distance between the bottom edge and the central axis is x. The entirety of the at least one aperture may be located in a portion of the exterior layer that at least 0.3x, for example between 0.3x-0.8x, 0.3x-0.6x, or 0.4x-0.9x away from the bottom edge of the cap. In certain embodiments, the cap will include a plurality of apertures. Each of the plurality of apertures may be located in a portion of the exterior layer that at least 0.3x, for example between 0.3x-0.8x, 0.3x-0.6x, or 0.4x-0.9x away from the bottom edge of the cap.

In certain of the above-noted embodiments, it is to be understood that the surface may be a portion thereof, for example a 1 mm by 1 mm portion.

While numerous embodiments have been shown and described herein, it will be obvious to those skilled in the art that such embodiments are provided by way of example only. It is intended that the following claims define the scope of the invention and that methods and structures within the scope of these claims and their equivalents be covered thereby. It is further understood that the disclosed embodiments are exemplary and that further various embodiments are understood by combining multiple features and limitations shown and described herein unless otherwise stated.

What is claimed is:

1. A lip balm receptacle, comprising:
    a curved, multi-layered upper portion, formed by a single two-step overmolding injection process using a camless inlay design mold, comprising:
        i) an interior layer having an outer surface that identifies a flavor of a lip balm contained in the lip balm receptacle, the outer surface of the interior layer having an exposed portion, the exposed portion having a surface area; and
        ii) an exterior layer bonded to the outer surface of the interior layer, the exterior layer having:
            a) an outer surface with a different visual appearance than the outer surface of the interior layer, the outer surface of the exterior layer having a surface area;
            b) a thickness of at least 0.25 mm and no more than 4 mm;
        iii) a curved durable cutout design positioned about a debossed logo, the durable cutout design comprising at least one aperture through the exterior layer exposing a fixed portion of the outer surface of the interior layer; wherein:
            1) the at least one aperture is located at a polar angle θ (theta) of between 5-60 degrees;
            2) the ratio of the surface area of the outer surface of the exterior layer to the surface area of the exposed outer surface of the interior layer is at least 1:1 to no more than 97:3;
            3) the ratio of the surface area of the outer surface of the exterior layer to the surface area of the exposed outer surface of the interior layer between the polar angle θ (theta) of 5-60 degrees is at least 90:10 to no more than 10:90;
            4) the distance between any first at least one aperture and any second at least one aperture is equivalent to or greater than the thickness of the exterior layer; and
            5) an aperture peripheral wall defined by the at least one aperture is substantially parallel to a longitudinal axis of the curved, multi-layered upper portion; and
        iv) first threads; and
    a lower portion having second threads, the lower portion connectable with the upper portion via interengagement of the first and second threads to fixedly close the lip balm receptacle.

2. The lip balm receptacle of claim 1, wherein the exterior layer of the durable cutout design resists being torn from the interior layer for a lifetime of the lip balm receptacle.

3. The lip balm receptacle of claim 1, wherein the exterior layer of the durable cutout design resists being removed from the interior layer for a usable lifetime of the lip balm receptacle.

4. The lip balm receptacle of claim 1, wherein the durable cutout design exposes at least 5% and no more than 45%, of the surface area of the outer surface of the interior layer.

5. The lip balm receptacle of claim 1, wherein the curved, multi-layered upper portion is exclusive of a flat or planar surface.

6. The lip balm receptacle of claim 1, wherein a curvature of the interior layer is substantially parallel to the curvature of the exterior layer such that no portion of the curved interior layer mechanically interlocks within an aperture extending through the exterior layer.

7. The lip balm receptacle of claim 1, wherein the aperture peripheral wall defined by the at least one aperture is beveled.

8. The lip balm receptacle of claim 1, wherein the aperture peripheral wall defined by the at least one aperture is substantially perpendicular to the outer surface of the interior layer.

9. The lip balm receptacle of claim 1, wherein the aperture peripheral wall defined by the at least one aperture is less than perpendicular to the outer of the interior layer.

10. The lip balm receptacle of claim 1, wherein the exterior layer is in direct contact with the outer surface of the interior layer and exclusive of an adhesive layer between the exterior layer and the interior layer.

11. The lip balm receptacle of claim 1, wherein a minimum thickness of the exterior layer is the narrowest dimension of the exterior layer.

12. The lip balm receptacle of claim 1, wherein the thickness of the exterior layer is narrower than the smallest width of any of the at least one aperture through the exterior layer.

13. The lip balm receptacle of claim 1, wherein a color of the exposed interior layer is a sole visual indicia of the lip balm flavor when the lip balm receptacle is closed.

14. The lip balm receptacle of claim 1, wherein the aperture peripheral wall defined by the at least one aperture is within, plus or minus 1-10 degrees, of parallel to the longitudinal axis of the curved, multi-layered upper portion.

15. The lip balm receptacle of claim 1, wherein the interior layer does not intersect an outer surface of a convex hull of the exterior layer of the lip balm receptacle.

* * * * *

UNITED STATES PATENT AND TRADEMARK OFFICE
CERTIFICATE OF CORRECTION

PATENT NO. : 10,112,751 B2
APPLICATION NO. : 15/232450
DATED : October 30, 2018
INVENTOR(S) : Jonathan Teller et al.

Page 1 of 1

It is certified that error appears in the above-identified patent and that said Letters Patent is hereby corrected as shown below:

On the Title Page

Page 2, Item (56) References Cited, Other Publications:
Column 2, Line 14: change "29/575,719" to -- 29/573,719 --; and
Column 2, Line 16: change "Teller, et al." to -- Teller et al. --.

Signed and Sealed this
Twelfth Day of February, 2019

Andrei Iancu
*Director of the United States Patent and Trademark Office*